(12) United States Patent
Kobayashi

(10) Patent No.: US 7,362,394 B2
(45) Date of Patent: Apr. 22, 2008

(54) COLOR FILTER FOR IPS AND LIQUID CRYSTAL DISPLAY APPARATUS

(75) Inventor: Hironori Kobayashi, Tokyo (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 491 days.

(21) Appl. No.: 11/150,761

(22) Filed: Jun. 10, 2005

(65) Prior Publication Data
US 2005/0280753 A1   Dec. 22, 2005

(30) Foreign Application Priority Data
Jun. 16, 2004   (JP) ............................ 2004-178942

(51) Int. Cl.
*G02F 1/1335* (2006.01)
*G02F 1/1343* (2006.01)
*G02F 1/136* (2006.01)

(52) U.S. Cl. .................. 349/106; 349/141; 349/44
(58) Field of Classification Search ............ 349/106, 349/141, 44, 146
See application file for complete search history.

(56) References Cited

U.S. PATENT DOCUMENTS

| 6,294,313 B1* | 9/2001 | Kobayashi et al. ......... 430/302 |
| 6,853,408 B2* | 2/2005 | Okamoto et al. ............ 349/44 |
| 2002/0063822 A1* | 5/2002 | Kondo et al. ............... 349/106 |

FOREIGN PATENT DOCUMENTS

| JP | 09-043589 | 2/1997 |
| JP | 09-311334 | 12/1997 |

* cited by examiner

*Primary Examiner*—Mike Qi
(74) *Attorney, Agent, or Firm*—Ladas & Parry LLP

(57) ABSTRACT

The main object of the present invention is to provide a color filter for the IPS having little disturbance of the electric line of force, and a liquid crystal display apparatus using the color filter for the IPS. In order to achieve the object, the present invention provides a color filter for the IPS, comprising a base material, a light shielding part formed on the base material, a semiconductor photo catalyst containing layer formed so as to cover the base material and light shielding part, containing at least a semiconductor photo catalyst and an organopolysiloxane, and a colored layer formed in an opening part of the light shielding part on the semiconductor photo catalyst containing layer, wherein the specific resistance value of the semiconductor photo catalyst containing layer is $10^6$ Ω·cm or more.

22 Claims, 9 Drawing Sheets

COLOR FILTER FOR IPS AND LIQUID CRYSTAL DISPLAY APPARATUS

BACKGROUND OF THE INVENTION

1. Field of the Invention

The present invention relates to a color filter for the IPS used for an IPS system liquid crystal display apparatus, and an IPS system liquid crystal display apparatus using the color filter for the IPS.

2. Description of the Related Art

Recently, with the development of the personal computers, in particular, the development of the portable personal computers, demand for a liquid crystal display, especially a color liquid crystal display tends to be increased. As such a liquid crystal display, an active matrix type liquid crystal display apparatus using a thin film transistor (hereinafter it is abbreviated as a TFT) as a pixel switching element, having a high grade image quality is used widely as a monitor for a space saving desk top computer, or the like. In general, as the operation modes for the liquid crystal display apparatus, there are a Twisted Nematic (TN) system having oriented liquid crystal molecules rotated in the direction perpendicular to the transparent substrates, an IPS (In-Plane Switching) system with those rotated in the direction parallel to the transparent substrates (for example, Japanese Patent Application Laid Open (JP-A) No. 9-311334), or the like.

Here, a color filter used for the IPS system liquid crystal display apparatus, in general comprises a base material, a light shielding part formed on the base material, and a colored layer formed in an opening part of the light shielding part. As shown in FIG. 13, in the case a liquid crystal display apparatus is provided with such a color filter used for the IPS system by disposing a color filter for the IPS 5 and a liquid crystal driving side substrate 11 facing each other, in the case the specific resistance value of the light shielding part 2 formed in the color filter for the IPS 5 is low, the electric line of force of the voltage applied from the liquid crystal driving side substrate 11 is attracted by the light shielding part 2 so as to provide an inclined and disturbed pattern. Thereby, the liquid crystals cannot be oriented to a targeted direction so that the light transmittance in the same pixel becomes different, and thus a problem is involved in that the color irregularity, or the like is generated in the liquid crystal display apparatus.

Then, in order to solve the problem, a method of using a light shielding part having a high specific resistance value, or the like has been proposed (JP-A No. 9-43589). However, even in the case such a light shielding part having a high specific resistance value is used, the electric line of force may be disturbed, and thus it is not sufficient and further improvement has been needed.

SUMMARY OF THE INVENTION

Therefore, a color filter for the IPS having little disturbance of the electric line of force, and a liquid crystal display apparatus using the color filter for the IPS are desired to be provided.

The present invention provides a color filter for the IPS, comprising a base material, a light shielding part formed on the base material, a semiconductor photo catalyst containing layer formed so as to cover the base material and light shielding part, containing at least a semiconductor photo catalyst and an organopolysiloxane, and a colored layer formed in an opening part of the light shielding part on the semiconductor photo catalyst containing layer, wherein a specific resistance value of the semiconductor photo catalyst containing layer is $10^6$ Ω·cm or more.

According to the present invention, since the specific resistance value of the semiconductor photo catalyst containing layer, formed so as to cover the light shielding part, evenly on the color filter for the IPS is the value or more, at the time the color filter for the IPS is used for a liquid crystal display apparatus, disturbance of the electric line of force of the voltage applied from the liquid crystal driving side substrate can be prevented so that a high quality apparatus without the color irregularity or the like can be provided. Moreover, according to the present invention, since the semiconductor photo catalyst containing layer contains the semiconductor photo catalyst and organopolysiloxane, for example, in the case an energy is directed from the base material side to the semiconductor photo catalyst containing layer, a wettability in the area other than the area with the light shielding part formed, that is, of the semiconductor photo catalyst containing layer of the opening part of the light shielding part can be changed. Therefore, utilizing the wettability difference, a colored layer forming coating solution for forming a colored layer can be applied easily by for example, an ink jet method. Moreover, the surface flatness is required in general to the color filter for the IPS. According to the present invention, since the colored layer can be formed by the ink jet method or the like, one having a high flatness can be provided, and thus it is advantageous.

Moreover, it is preferable that the specific resistance value of the light shielding part is $10^6$ Ω·cm or more, and the specific resistance value of the semiconductor photo catalyst containing layer is higher than the specific resistance value of the light shielding part. Thereby, at the time of providing a liquid crystal display apparatus, one without the disturbance of the electric line of force or the like can further be provided.

Furthermore, it is preferable that an over-coating layer is formed on the colored layer, and the specific resistance value of the over-coating layer is $10^6$ Ω·cm or more. In this case, the disturbance of the electric line of force can also be prevented by the over-coating layer.

Moreover, it is preferable that a transparent conductive layer is formed on the base material on an opposite side with respect to a side with the colored layer formed. Thereby, at the time of producing a color film for the IPS or at the time of providing a liquid crystal display apparatus, electrification of the color filter for the IPS can be prevented so that the disturbance of the electric line of force can be further prevented, or the like.

Furthermore, according to the present invention, it is preferable that the colored layer is formed by an ink jet method. Thereby, the colored layer can be formed highly precisely according to the pattern with the wettability of the semiconductor photo catalyst containing layer changed as well as the flatness of the color filter for the IPS can be improved.

Moreover, the present invention provides a production method for a color filter for the IPS, in which the color filter is the color filter mentioned above, wherein the colored layer is bent and formed by relatively moving the substrate, a head of an ink jet apparatus for forming the colored layer at the time of forming the colored layer by the ink jet method, and dropping an ink discharged from the head linearly with respect to the bent colored layer so that the bent colored layer is formed by wetting and spreading the dropped ink.

According to the present invention, in addition to the above-mentioned effects of the color filter for the IPS, since the colored layer forming ink discharged by the ink jet method wets and spreads on the semiconductor photo catalyst containing layer, even in the case the ink for forming the colored layer is discharged linearly with respect to the bent colored layer for the IPS, a color filter can be produced. Therefore, owing to the operation easiness, a highly precise product can be produced as well as the production yield can be improved.

Furthermore, the present invention provides a liquid crystal display apparatus comprising any of the color filters for the IPS, a liquid crystal driving side substrate having an electrode disposed facing the color filter for the IPS, and a liquid crystal layer sandwiched between the color filter for the IPS and the liquid crystal driving side substrate, wherein the specific resistance value of the liquid crystal layer is $10^9$ $\Omega \cdot cm$ or more.

According to the present invention, since the liquid crystal display apparatus uses the color filter for the IPS and the liquid crystal layer having the specific resistance value, a high quality liquid crystal display apparatus without the disturbance of the electric line of force form the liquid crystal driving side substrate, the color irregularity, or the like can be provided.

Moreover, the present invention provides a liquid crystal display apparatus comprising any of the color filters for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of ±1 degree to ±30 degrees.

Moreover, the present invention provides a liquid crystal display apparatus comprising any of the color filters for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of ±1 degree to ±30 degrees.

Furthermore, the present invention provides a liquid crystal display apparatus comprising any of the color filters for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of 60 degrees to 120 degrees except 90 degrees.

Moreover, the present invention provides a liquid crystal display apparatus comprising any of the color filters for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of 60 degrees to 120 degrees except 90 degrees.

In any of the embodiments mentioned above, since a liquid crystal display apparatus using the color filter for the IPS is used, one without the disturbance of the electric line of force from the liquid crystal driving side substrate can be provided. Moreover, since the scanning line or video signal wiring and the pixel electrodes have a bent structure having the angle with respect to the liquid crystal direction, at the time of applying a voltage, the liquid crystals can be rotated in two directions so that a liquid crystal display apparatus having a high angle of visibility can be provided.

According to the present invention, at the time of using a color filter for the IPS for a liquid crystal display apparatus, a high quality product with little disturbance of the electric line of force of the voltage applied from the liquid crystal driving side substrate, without the color irregularity, or the like can be provided. Moreover, utilizing the wettability difference of the semiconductor photo catalyst containing layer, a colored layer forming coating solution for forming a colored layer can be coated easily by the ink jet method or the like so that the excellent color filter for the IPS in terms of the flatness, the production efficiency, or the like can be provided.

DESCRIPTION OF THE PREFERRED EMBODIMENTS

The present invention relates to a color filter for the IPS used for an IPS system liquid crystal display apparatus, a liquid crystal display apparatus using the color filter for the IPS, and furthermore, a production method for the color filter for the IPS. Hereinafter, each of them will be explained in detail.

A. Color Filter for the IPS

First, a color filter for the IPS of the present invention will be explained. The color filter for the IPS of the present invention comprises a base material, a light shielding part formed on the base material, a semiconductor photo catalyst containing layer formed so as to cover the base material and light shielding part, containing at least a semiconductor photo catalyst and an organopolysiloxane, and a colored layer formed in an opening part of the light shielding part on the semiconductor photo catalyst containing layer, wherein the specific resistance value of the semiconductor photo catalyst containing layer is $10^6$ Ω·cm or more.

Figure 1:
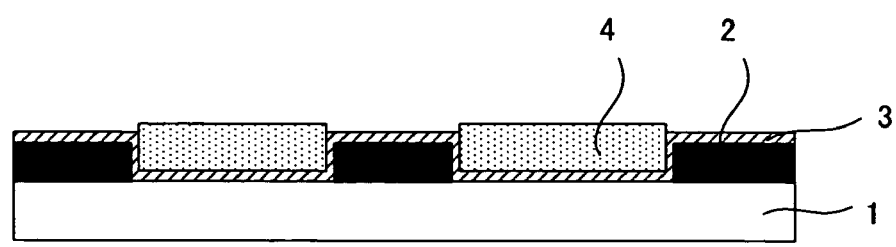
FIG. 1 is a process diagram showing an example of the color filter for the IPS of the present invention.

For example, as shown in FIG. 1, the color filter for the IPS of the present invention comprises a base material 1, a light shielding part 2 formed on the base material 1, a semiconductor photo catalyst containing layer 3 formed so as to cover the base material 1 and the light shielding part 2, and a colored layer 4 formed on the semiconductor photo catalyst containing layer 3 which is on an opening part of the light shielding part 2, wherein the specific resistance value of the semiconductor photo catalyst containing layer 3 is a specific value of a predetermined value or more.

Here, according to a common color filter for the IPS, having a light shielding part, since the specific resistance value of the light shielding part is lower than that of the other members so that in the case the color filter for the IPS is used for a liquid crystal display apparatus, the electric line of force from the liquid crystal driving side substrate facing the color filter for the IPS is pulled to the light shielding part side as mentioned above so as to have an inclined and disturbed pattern. Thereby, the liquid crystal orientation is disturbed so that the transmittance in the same pixel differs so as to cause the color irregularity or the like.

Figure 2:
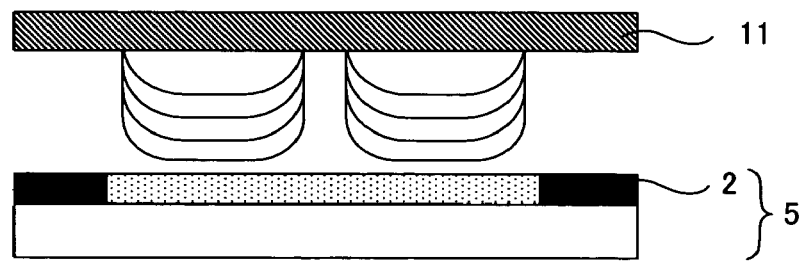
FIG. 2 is an explanatory diagram showing the electric line of force at the time of using the color filter for the IPS of the present invention for a liquid crystal display apparatus.

On the other hand, according to the present invention, a semiconductor photo catalyst containing layer having a specific resistance value of the value or more is formed on the light shielding part. Thereby, the specific resistance value of the entire surface of the color filter for the IPS can be homogeneous, moreover, since one having a specific resistance value of the value or more cannot influence the electric field, for example as shown in FIG. 2, at the time of using the same for a liquid crystal display apparatus, one with little disturbance of the electric line of force can be provided.

Moreover, according to the present invention, since the semiconductor photo catalyst containing layer contains a semiconductor photo catalyst and an organopolysiloxane, according to the function of the semiconductor photo catalyst accompanied by the energy irradiation, the wettability of the semiconductor photo catalyst containing layer can be changed. Therefore, for example at the time of forming a color filter for the IPS, by directing an energy to the semiconductor photo catalyst containing layer from the base material side, the wettability of only the semiconductor photo catalyst containing layer of the area without the light shielding part formation can be changed. Thereby, by coating a colored layer forming coating solution for forming a colored layer onto the area with the wettability changed by for example the ink jet method or the like, the colored layer can be formed easily.

Figure 3A:
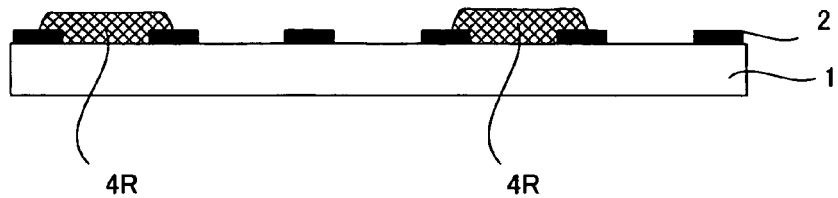
FIGS. 3A, 3B, 3C, 3D and 3E are a process diagrams for explaining the process for forming a colored layer by the conventional photolithography method.
Figure 3B:
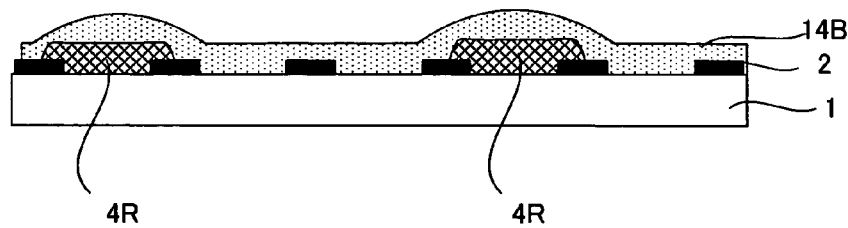
Figure 3C:
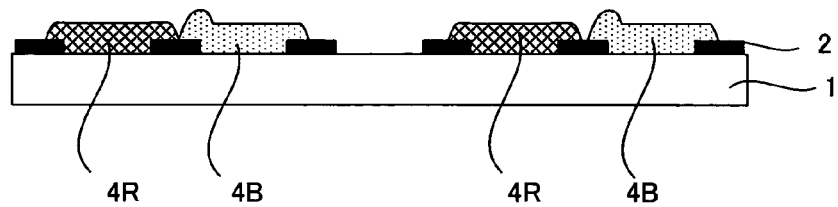
Figure 3D:
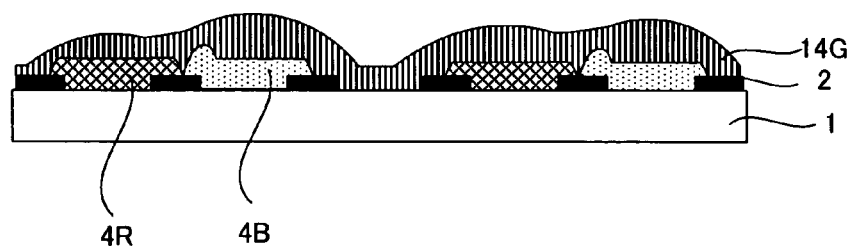

Moreover, in terms of the control of the liquid crystal orientation at the time of using as a liquid crystal display apparatus, in general, the surface flatness is required to a color filter for the IPS. However, in the case a colored layer is formed by a plurality of times for red (R), green (G), blue (B), or the like, by the photolithography method, it has been difficult to form the colored layer into a shape having the flatness. For example as shown in FIGS. 3A, 3B, 3C, 3D and 3E, a first color colored layer 4R is formed by such as the photolithography method, so as to partly cover the light shielding part 2 on the opening part of the base material 1 with the light shielding part 2 formed (FIG. 3A). Subsequently, a colored layer forming composition 14B for forming a second color colored layer is coated on the base material 1 with the colored layer 4R formed (FIG. 3B) and only the targeted area is hardened so as to form a colored layer 4B (FIG. 3C). Here, at the time of coating the colored layer forming composition 14B, the colored layer 4R is formed on the base material 1 so that the film thickness of the colored layer forming composition 14B coated thereon is thicker in the vicinity of the area with the colored layer 4R formed. Therefore, the film thickness of the colored layer 4B to be formed by hardening the colored layer forming composition 14B on the colored layer 4R side is higher than the film thickness of the colored layer 4R. In the case a colored layer forming composition 14G for a third color to be formed in the same manner is coated (FIG. 3D), since the colored layers 4R and 4B are formed already on the both sides of the area for forming the colored layer, the film thickness of the colored layer forming composition 14G in the vicinity thereof is higher so that at the time of hardening the same or the like so as to provide a colored layer 4G, the film thickness of the area laminated on the light shielding part 2 is higher compared with the colored layers 4R and 4B

Figure 3E:
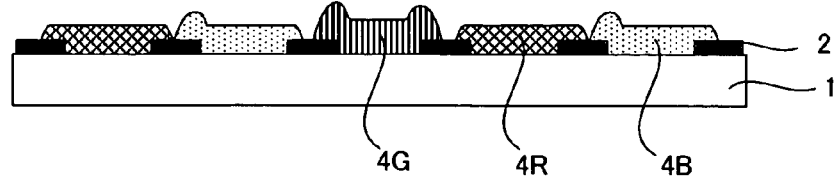

(FIG. 3E). Therefore, in the case of forming a colored layer by the photolithography or the like, the colored layer flatness is low so that it is flattened by forming an over-coating layer on the colored layer.

On the other hand, according to the present invention, as mentioned above, since the colored layer can be formed by the ink jet method or the like, one having a high colored layer flatness can be provided without the need of executing the process. Therefore, it is advantageous in that the over-coating layer needs not be formed and that it can easily be flattened by the over-coating layer.

Hereinafter, each configuration of the color filter for the IPS of the present invention will be explained in detail.

1. Semiconductor Photo Catalyst Containing Layer

First, a semiconductor photo catalyst containing layer to be used for a color filter for the IPS of the present invention will be explained. The semiconductor photo catalyst containing layer used for a color filter for the IPS of the present invention is not particularly limited as long as it contains a semiconductor photo catalyst and an organopolysiloxane, and it is formed so as to cover the base material and the light shielding part to be described later, and it has the specific resistance value of a predetermined value or more. In general, the semiconductor photo catalyst containing layer is formed in a state of a mixture with the semiconductor photo catalyst fine particles covered partially or totally with the organopolysiloxane so that the semiconductor photo catalyst fine particles are exposed partially to the surface.

The specific resistance value of the semiconductor photo catalyst containing layer is specifically $10^6$ Ω·cm or more, and it is preferably in a range of $10^7$ Ω·cm to $10^{16}$ Ω·cm, in particular, in a range of $10^9$ Ω cm to $10^{15}$ Ω·cm. Thereby, at the time of providing a liquid crystal display apparatus with the color filter for the IPS of the present invention and a liquid crystal driving side substrate facing with each other, the electric line of force from the liquid crystal driving side substrate is not influenced, and furthermore, disturbance of the electric line of force by the influence of the specific resistance value of the light shielding part to be described later can be prevented as well. In the present invention, it is preferable that the specific resistance value of the semiconductor photo catalyst containing layer is higher than that of the light shielding part to be described later. Thereby, the influence of the light shielding part on the electric line of force can be further reduced.

Here, the value of the specific resistance value is the value measured as follows. A material for forming a semiconductor photo catalyst containing layer is coated on a glass substrate having an ITO electrode which has a 1 cm square measurement area and a 1 mm width, 10 mm length electrode taking out pattern formed preliminarily, and it is dried and baked so as to form a photo catalyst containing layer having a 0.3 μm film thickness. Onto the photo catalyst containing layer, a 0.1 μm gold electrode is formed by the vacuum deposition method so as to be superimposed on the ITO electrode measurement surface via the semiconductor photo catalyst containing layer to form a sandwich cell. To the gold electrode, an electrode taking out pattern is formed in the same shape as the ITO electrode at a position not superimposed on the ITO electrode taking out pattern. Thereafter, the electrode area and the thickness of the semiconductor photo catalyst containing layer are calculated from the obtained electric current value by applying a constant voltage using a Model 237 High-Voltage Source-Measure Unit produced by Keithley Instruments Inc., and it is converted by the conductivity.

Moreover, since the organopolysiloxane is contained in the semiconductor photo catalyst containing layer, the surface wettability can be changed by the function of the semiconductor photo catalyst at the time of the energy irradiation so that the area with the energy irradiation can be provided as a lyophilic area, and the area without the energy irradiation as a liquid repellent area.

According to the present invention, in the part without the energy irradiation, that is, in the liquid repellent area, it is preferable that the contact angle with respect to a liquid having 40 mN/m is 10° or more, preferably the contact angle with respect to a liquid having a 30 mN/m surface tension is 10° or more, and particularly preferably the contact angle with respect to a liquid having a 20 mN/m surface tension is 10° or more. Since the part without the energy irradiation is the part required to have the liquid repellent property, in the case the contact angle with respect to the liquid is small, due to the insufficient liquid repellent property, for example in the case of coating and hardening a colored layer forming coating solution for forming a colored layer to be described later by the ink jet method or the like, the colored layer forming coating solution may be adhered also onto the liquid repellent area, a highly precise pattern can hardly be formed.

Moreover, it is preferable that the semiconductor photo catalyst containing layer in the part with the energy irradiation, that is, in the lyophilic area, is a layer having the contact angle with respect to a liquid having a 40 mN/m surface tension of less than 9°, preferably the contact angle with respect to a liquid having a 50 mN/m surface tension of 10° or less, and particularly preferably the contact angle with respect to a liquid having a 60 mN/m surface tension of 10° or less. In the case the contact angle with respect to a liquid in the part with the energy irradiation, that is, in the lyophilic area is high, for example the colored layer forming coating solution for forming the colored layer can be repelled also in the lyophilic area. At the time of coating the colored layer forming coating solution by the ink jet method or the like, formation of the colored layer may be difficult without sufficient spreading of the colored layer forming coating solution.

The contact angle with respect to a liquid here is obtained from the results or a graph of the results of measuring (30 seconds after of dropping liquid droplets from a micro syringe) the contact angle with respect to liquids having various surface tensions using a contact angle measuring device (CA-Z type manufactured by Kyowa Interface Science, Co., Ltd.). Moreover, at the time of the measurement, as the liquids having the various surface tensions, wetting index standard solution manufactured by JUNSEI CHEMICAL CO., LTD. were used.

According to the semiconductor photo catalyst containing layer used in the present invention, the semiconductor photo catalyst containing layer may be formed such that a fluorine is contained in the semiconductor photo catalyst containing layer, and furthermore, the fluorine content of the semiconductor photo catalyst containing layer surface is lowered at the time of directing an energy to the semiconductor photo catalyst containing layer according to the function of the semiconductor photo catalyst compared with the state before the energy irradiation. Moreover, it maybe formed including a decomposing substance to be decomposed by the function of the semiconductor photo catalyst by the energy irradiation, and thereby changing the wettability on the semiconductor photo catalyst containing layer.

Hereinafter, the semiconductor photo catalyst, the organopolysiloxane, and the other components comprising such a semiconductor photo catalyst containing layer will be explained.

a. Semiconductor Photo Catalyst

First, the semiconductor photo catalyst used in the present invention will be explained. As the semiconductor photo catalyst used in the present invention, those known as photo semiconductors, such as a titanium dioxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$) can be presented, and one or two or more kinds as a mixture can be selected and used from them.

According to the present invention, in particular, a titanium dioxide can be used preferably since it has high band gap energy, it is chemically stable without the toxicity, and it can be obtained easily. There are an anatase type and a rutile type in the titanium dioxides, and either can be used in the present invention, however, the anatase type titanium dioxide is preferable. The anatase type titanium dioxide has a 380 nm or less excitation wavelength.

As the anatase type titanium dioxide, for example, a hydrochloric acid deflocculation type anatase type titania sol (STS-02 (average particle diameter 7 nm) manufactured by ISHIHARA SANGYO KAISHA, LTD., ST-K01 manufactured by ISHIHARA SANGYO KAISHA, LTD.), a nitric acid deflocculation type anatase type titania sol (TA-15 (average particle diameter 12 nm) manufactured by Nissan Chemical Industries, Ltd. ), or the like can be presented.

With a smaller particle diameter of the semiconductor photo catalyst, the semiconductor photo catalyst reaction can be generated effectively, and thus it is preferable. An average particle diameter of 50 nm or less is preferable, and use of a semiconductor photo catalyst of 20 nm or less is particularly preferable.

The semiconductor photo catalyst content in the semiconductor photo catalyst containing layer used in the present invention can be set in a range of 5 to 60% by weight, preferably in a range of 20 to 40% by weight. Thereby, the bonding property with the ITO layer to be described later can be preferable.

b. Organopolysiloxane

Next, the organopolysiloxane used in the present invention will be explained. The organopolysiloxane used in the present invention is not particularly limited as long as it can change the wettability of the semiconductor photo catalyst containing layer surface by the function of the semiconductor photo catalyst accompanied by the energy irradiation. In particular, those having a high bond energy such that the principal skeleton is not decomposed by the photo excitation of the semiconductor photo catalyst, and an organic substituent to be decomposed by the function of the semiconductor photo catalyst are preferable. Specifically, (1) an organopolysiloxane to provide high strength by hydrolysis or polycondensation of a chloro or alkoxy silane, or the like by the sol gel reaction or the like, (2) an organopolysiloxane obtained by cross-linking a reactive silicone having the excellent water repellent property or the oil repellent property, or the like can be presented.

In the case (1), it is preferably an organopolysiloxane as a hydrolyzed condensation product or a co-hydrolyzed condensation product of one or two or more kinds of silicon compounds represented by the general formula:

(Here, Y is an alkyl group, a fluoroalkyl group, a vinyl group, an amino group, a phenyl group, a chloroalkyl group, an isocyanate group, an epoxy group or an organic group containing them, and X is an alkoxyl group, an acetyl group or a halogen. n is an integer from 0 to 3). Here, the alkoxy group represented by X is preferably a methoxy group, an ethoxy group, a propoxy group, or a butoxy group. Moreover, the number of atoms of the entire organic group represented by Y is preferably in a range of 1 to 20, in particular, in a range of 5 to 10.

Thereby, at the time of forming the semiconductor photo catalyst containing layer, the surface can be provided with the liquid repellent property by the Y comprising the organopolysiloxane. Moreover, according to the function of the semiconductor photo catalyst accompanied by the energy irradiation, the lyophilic property can be provided by the decomposition of the Y, or the like.

Moreover, since the semiconductor photo catalyst containing layer before the energy irradiation can have the particularly high liquid repellent property in the case an organopolysiloxane having the Y comprising the organopolysiloxane as a fluoro alkyl group, it is preferable to use an organopolysiloxane having the fluoro alkyl group in the case a high liquid repellent property is required, or the like. As such an organopolysiloxane, specifically, a hydrolyzed condensation product or a co-hydrolyzed condensation product of one or two or more kinds of the below-mentioned fluoroalkylsilanes can be presented. Those known as a fluorine based silane coupling agent can be used. For example, those disclosed in JP-A No. 2001-074928 can be used.

Moreover, as the reactive silicone (2), compounds having a skeleton represented by the following general formula can be presented.

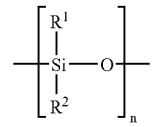

n is an integer of 2 or more, $R^1$, $R^2$ each are a substituted or non substituted alkyl, alkenyl, aryl or cyanoalkyl group having 1 to 10 carbon atoms, and 40% or less of the entirety based on the mole ratio is a vinyl, a phenyl, or a halogenated phenyl. Moreover, those having $R^1$, $R^2$ as a methyl group are preferable since the surface energy becomes the smallest, and it is preferable that a methyl group accounts for 60% or more based on the mole ratio. Moreover, at least one reactive group such as a hydroxyl group is provided in a molecular chain at the chain end or the side chain.

It is preferable that the organopolysiloxane is contained in the semiconductor photo catalyst containing layer from 5% by weight to 90% by weight, in particular, about from 30% by weight to 60% by weight.

c. Other Substances

Moreover, to the semiconductor photo catalyst containing layer used in the present invention, together with the organopolysiloxane, a stable organosilicon compound not to have the cross-linking reaction such as a dimethylpolysiloxane may be mixed to a binder. Furthermore, as a binder, a polysiloxane having a principal skeleton with a high bond energy not to be decomposed by the photo excitation of the semiconductor photo catalyst, not having an organic substituent, or having an organic substituent can be presented.

Specifically, a hydrolysis or polycondensation product of a tetramethoxysilane, a tetraethoxysilane, or the like may be contained.

Furthermore, in order to aid the function of changing the wettability of the organopolysiloxane, or the like, a decomposable substance to be decomposed by the energy irradiation maybe contained. As such a decomposable substance, a surfactant to be decomposed by the function of the semiconductor photo catalyst, having the function of changing the wettability of the semiconductor photo catalyst containing layer surface according to the decomposition can be presented. Moreover, in addition to the surfactant, as needed, various kinds of additives maybe contained. As the surfactants and additives, for example, those disclosed in JP-A No. 2001-074928 can be used.

d. Containment of the Fluorine

Moreover, according to the present invention, it is preferable that the semiconductor photo catalyst containing layer contains a fluorine, and furthermore, the semiconductor photo catalyst containing layer is formed so as to have the fluorine content of the semiconductor photo catalyst containing layer surface is lowered with respect to the state before the energy irradiation by the function of the semiconductor photo catalyst at the time an energy is irradiated to the semiconductor photo catalyst containing layer. Thereby, according to the pattern irradiation of the energy, as it will be described later, a pattern having a part with a small fluorine content can be formed easily. Here, since the fluorine has an extremely low surface energy, the surface of a substance containing a large amount of a fluorine has a smaller critical surface tension. Therefore, the critical surface tension of a part with a small fluorine content is larger than the critical surface tension of the surface of a substance with a large fluorine content. That is, it denotes that the part with a small fluorine content becomes a lyophilic area compared with the part with a large fluorine content. Therefore, by forming a pattern comprising a part with a small fluorine content compared with the surface of the periphery, a pattern of a lyophilic area is formed in a liquid repellent area.

Therefore, in the case such a semiconductor photo catalyst containing layer is used, since a lyophilic area pattern can be formed easily in the liquid repellent area by the pattern irradiation of the energy, for example, in the case of coating a colored layer forming coating solution by the ink jet method, or the like, a highly precise colored layer can be formed.

As to the fluorine content in the semiconductor photo catalyst containing layer containing a fluorine as mentioned above, the fluorine content in the lyophilic area having a low fluorine content formed by the energy irradiation is 10 or less based on the fluorine content in the area without the energy irradiation as 100, it is preferably 5 or less, and it is particularly preferably 1 or less.

According to the range, a large difference can be generated in terms of the lyophilic property in the energy irradiated part and the unirradiated part. Therefore, by adhering for example a colored layer forming coating solution to such a semiconductor photo catalyst containing layer, the colored layer can be formed accurately only in the lyophilic area with the fluorine content lowered so that a color filter for the IPS good in precision can be obtained. The lowering ratio is based on the weight.

As to the measurement of the fluorine content in the semiconductor photo catalyst containing layer, various methods commonly executed can be used, and it is not particularly limited as long as it is a method capable of measuring the fluorine amount quantitatively on the surface such as the X-ray Photoelectron Spectroscopy, the ESCA (it is also referred to as the Electron Spectroscopy for Chemical Analysis), the fluorescent X ray analysis method, and the mass spectrometry.

Moreover, according to the present invention, a titanium dioxide can be used preferably as the semiconductor photo catalyst as mentioned above. As the fluorine content in the semiconductor photo catalyst containing layer in the case of using the titanium dioxide, it is preferable that the fluorine (F) element is contained in the semiconductor photo catalyst containing layer surface by the ratio with the fluorine (F) element of 500 or more, preferably 800 or more, and particularly preferably 1,200 or more with the premise that the titanium (Ti) element is 100 according to the analysis and quantification by the X-ray Photoelectron Spectroscopy.

Since the fluorine (F) is contained in the semiconductor photo catalyst containing layer to this extent, the critical surface tension on the semiconductor photo catalyst containing layer can be made sufficiently low so that the liquid repellent property in the surface can be ensured. Thereby, the wettability difference of the pattern part with the fluorine content reduced by the energy pattern irradiation with respect to the surface lyophilic area can be made larger so that the precision of the color filter for the IPS to be obtained finally can be improved.

Furthermore, according to such a color filter for the IPS, as to the fluorine content in the lyophilic area formed by the energy pattern irradiation, it is preferable that the fluorine (F) element is contained by the ratio of 50 or less, preferably 20 or less, and particularly preferably 10 or less with the premise that the titanium (Ti) element is 100.

In the case the fluorine content in the semiconductor photo catalyst containing layer is reduced to this extent, a lyophilic property sufficient for forming a color filter for the IPS can be obtained so that the color filter for the IPS can be formed precisely according to the liquid repellent property and the wettability difference with respect to the part with the energy not irradiated, and thus a color filter for the IPS having the high utilization value can be obtained.

e. Method for Forming a Semiconductor Photo Catalyst Containing Layer

Figure 4A:
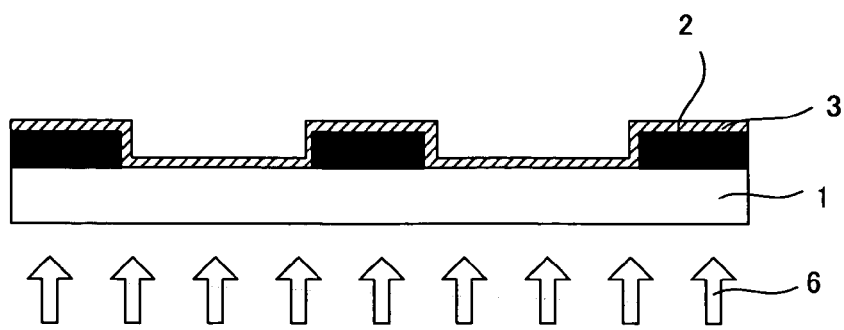
FIGS. 4A and 4B are an explanatory diagrams for explaining the process for changing the wettability of the semiconductor photo catalyst containing layer to be used for the present invention.
Figure 4B:
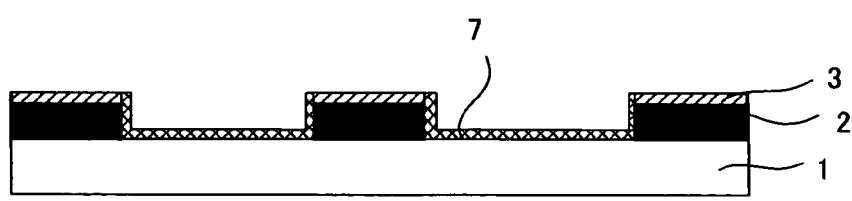

As to the method for forming the semiconductor photo catalyst containing layer mentioned above, it can be formed by dispersing the semiconductor photo catalyst and organopolysiloxane in a solvent as needed with the other additives so as to prepare a coating solution, and coating the coating solution onto a base material with the light shielding part formed. As the solvent to be used, alcohol based organic solvents such as an ethanol and an isopropanol are preferable. The coating operation can be carried out by a known coating method such as spin coating, spray coating, dip coating, roll coating and bead coating. In the case an ultraviolet ray hardening type component is contained as a binder, the semiconductor photo catalyst containing layer can be formed with an execution of a hardening process by irradiating an ultraviolet ray. At the time, the thickness of the semiconductor photo catalyst containing layer is preferably in a range of 0.05 μm to 10 μm. In the case it is thinner than the ratio, disturbance of the electric line of force can hardly be prevented, or the function of the wettability change, or the like of the surface of the semiconductor photo catalyst containing layer can be made lower, and thus it is not preferable. Moreover in the case it is thicker than the range, since the distance between the light shielding part to be described later and the colored layer is long, when the color filter for the IPS is used for a liquid crystal display apparatus, problems such as the light leakage of the back light, or the like can be generated, and thus it is not preferable.

f. Method for Forming a Wettability Changeable Pattern on the Semiconductor Photo Catalyst Containing Layer Next, the method for forming a wettability changeable pattern with the wettability changed by the pattern for forming the colored layer to be described later by the energy irradiation to the semiconductor photo catalyst containing layer will be explained. According to the present invention, as mentioned above, the organopolysiloxane in the semiconductor photo catalyst containing layer has the wettability change by the function of the semiconductor photo catalyst accompanied by the energy irradiation. Therefore, for example, as shown in FIGS. 4A and 4B, by directing the base material 1 side energy 6 to the semiconductor photo catalyst containing layer 3 (FIG. 4A), the wettability of only the semiconductor photo catalyst containing layer 3 in the area without the light shielding part 2 formation can be changed so that the wettability changeable pattern 7 with the wettability changed can be formed on the semiconductor photo catalyst containing layer 3 (FIG. 4B). Thereby, at the time of coating the colored layer forming coating solution for forming the colored layer to be described later by the ink jet method or the like, the colored layer forming coating solution can be adhered only on the wettability changeable pattern 7 with the wettability changed without the ink adhesion onto the area without the energy irradiation so that the colored layer can be formed highly precisely.

Here, as the energy to be directed to the semiconductor photo catalyst containing layer, the method is not particularly limited as long as it is a method for directing an energy capable of changing the wettability of the semiconductor photo catalyst containing layer. The energy irradiation (exposure) in the present invention is the concept including any irradiation of the energy line capable of changing the wettability of the semiconductor photo catalyst containing layer surface, and thus it is not limited to the visible light irradiation.

For the energy irradiation, in general, an ultraviolet ray can be used, and the light wavelength can be set in a range of 400 nm or less, preferably in a range of 150 nm to 380 nm or less because the preferable photo catalyst used for the photo catalyst containing layer is a titanium dioxide as mentioned above, and a light having the above-mentioned wavelength is preferable as the energy for activating the semiconductor photo catalyst function by the titanium dioxide.

As a light source to be used for the energy irradiation, a mercury lamp, a metal halide lamp, a xenon lamp, an excimer lamp, and various other light sources can be presented. Moreover, in addition to the method of executing the pattern irradiation via a photo mask using the light source mentioned above, a method of drawing irradiation in a pattern using a laser such as an excimer, a YAG, or the like can be used as well.

The energy irradiation amount at the time of the energy irradiation is defined to be the irradiation amount necessary for changing the wettability of the semiconductor photo catalyst containing layer surface by the function of the semiconductor photo catalyst in the semiconductor photo catalyst containing layer.

At the time, by irradiating the energy while heating the semiconductor photo catalyst containing layer, the sensitivity can be further raised so that the wettability can be changed efficiently, and thus it is preferable in this regard. Specifically, it is preferable to heat in a range of 30° C. to 80° C.

2. Light Shielding Part

Next, the light shielding part used in the present invention will be explained. The light shielding part used in the present invention is formed on a base material to be described later for shielding the irradiated energy at the time of providing a color filter for the IPS, and it is not particularly limited as long as it has a high specific resistance value.

In the present invention, the specific resistance value of the light shielding part is specifically $10^6$ Ω·cm or more, and it is preferably in a range of $10^7$ Ω·cm to $10^{16}$ Ω·cm in particular, in a range of $10^9$ Ω·cm to $10^{15}$ Ω·cm. In the case it is lower than the value, even in the case the semiconductor photo catalyst containing layer is formed the light shielding part may pose the influence on the electric line of force, and thus it is not preferable. Moreover, in the case it is higher than the value, the insulation property of the light shielding part is so high that the static electricity can easily be generated so as to cause the electrostatic breakage or dust adhesion, and thus it is not preferable. The specific resistance value is the value measured by the method same as that explained in the paragraph of the semiconductor photo catalyst containing layer.

As the light shielding part, it may be a resin light shielding part. As the method for forming the resin light shielding part, for example, a method of forming a layer containing carbon fine particles, light shielding particles of a metal oxide, an inorganic pigment, an organic pigment, or the like in a resin binder in to a pattern, or the like can be used. As the resin binder to be used, one kind or a mixture of two or more kinds of resins such as a polyimide resin, an acrylic resin, an epoxy resin, a polyacrylicamide, a polyvinyl alcohol, a gelatin, a casein, and a cellulose, a photosensitive resin, an O/W emulsion type resin composition such as an emulsion of a reactive silicone, or the like can be used. The thickness of the resin light shielding part can be set in a range of 0.5 to 10 μm. As the patterning method for the resin light shielding part, a commonly used method such as a photolithography method or a printing method can be used.

Moreover, the light shielding part may be formed by the thermal transfer method. According to the thermal transfer method for forming the light shielding part in general, a light shielding part is formed by disposing on a base material a thermal transfer sheet with a photo thermal conversion layer and a light shielding part transfer layer provided on one side of a transparent film base material, and directing an energy to the area for forming the light shielding part so as to transfer the light shielding part transfer layer onto the base material. The film thickness of the light shielding part to be formed by the thermal transfer method is in general 0.5 μm to 10.0 μm, and in particular about 0.8 μm to 5.0 μm.

The light shielding part to be transferred by the thermal transfer method in general comprises a light shielding material and a binding agent. As the light shielding material, inorganic particles of a carbon black, a titanium black, or the like can be used. The particle size of the light shielding material is preferably in a range of 0.01 μm to 1.0 μm, in particular, in a range of 0.03 μm to 0.3 μm.

Moreover, as to the binding agent, it is preferable that it has a resin composition having the thermoplastic property and the thermosetting property, and it is preferable that it has a thermosetting functional group, a resin material having a softening point in a range of 50° C. to 150° C., in particular, 60° C. to 120° C., and a hardening agent, or the like. As such a material, specifically, an epoxy compound having two or more epoxy groups in one molecule, a combination of an epoxy resin and a potential hardening agent thereof, or the like can be presented. Moreover, as the potential hardening agent for an epoxy resin, a hardening agent not showing the reactivity with an epoxy resin up to a certain temperature and having the molecular structure change to show the reactivity with the epoxy resin at the time it reaches at the activating temperature by heating can be used. Specifically, a neutral salt or complex of an acidic or basic compound having the reactivity with an epoxy resin, a block compound, a high melting point substance, and a micro capsule contained substance can be presented. Moreover, in the light shielding part, in addition to the materials, a mold releasing agent, a bonding auxiliary agent, an antioxidant, a dispersing agent, or the like may be contained.

Here, according to the present invention, a primer layer may be formed between the semiconductor photo catalyst containing layer and the light shielding part. Although the effect and the function of the primer layer is not always clear, it is considered that by forming the primer layer, the primer layer provides the function of preventing diffusion of the impurities from the opening part existing in the light shielding part or between the light shielding parts, in particular, impurities such as residues generated from the light shielding part is patterned, to be the factor of inhibiting the wettability change of the semiconductor photo catalyst containing layer. Therefore, by forming the primer layer, the wettability of the semiconductor photo catalyst containing layer can be changed with a high sensitivity, and as a result, a pattern with a high resolution can be obtained.

In the present invention, since the primer layer is for preventing the influence on the semiconductor photo catalyst effect by the impurities existing not only on the light shielding part but also in the opening part formed between the light shielding parts, it is preferable that the primer layer is formed on the entire surface of the light shielding part including the opening part.

The primer layer in the present invention is not particularly limited as long as it has a structure with the primer layer formed without having the light shielding part and the semiconductor photo catalyst containing layer contacted.

The material for providing the primer layer is not particularly limited, but an inorganic material to be hardly decomposed by the function of the semiconductor photo catalyst is preferable. Specifically, an amorphous silica can be presented. In the case of using the amorphous silica, the precursor of the amorphous silica is represented by the general formula: $SiX_4$. X is preferably a silicon compound such as a halogen, a methoxy group, an ethoxy group, an acetyl group, or the like, a silanol as a hydrolysis product thereof, or a polysiloxane having a 3,000 or less average molecular weight.

Moreover, the film thickness of the primer layer is preferably in a range of 0.001 μm to 1 μm, and particularly preferably in a range of 0.001 μm to 0.1 μm.

3. Colored Layer

Next, the colored layer used in the present invention will be explained. The colored layer used in the present invention is formed on the semiconductor photo catalyst containing layer formed in the opening part of the light shielding part. As mentioned above, it can be formed along the wettability changeable pattern with the semiconductor photo catalyst containing layer changed.

Figure 5A:
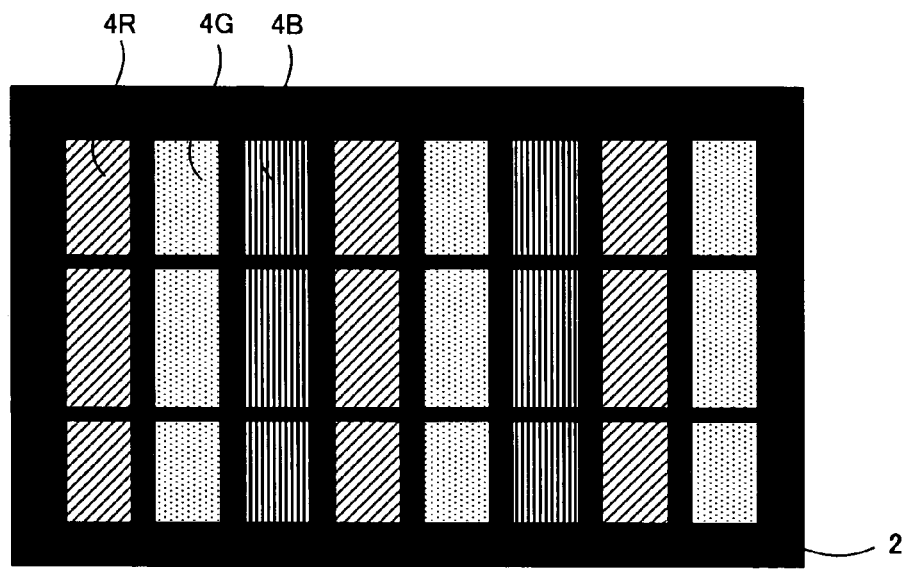
FIGS. 5A, 5B and 5C are explanatory diagrams for explaining the colored layer pattern of the color filter for the IPS of the present invention.
Figure 5B:
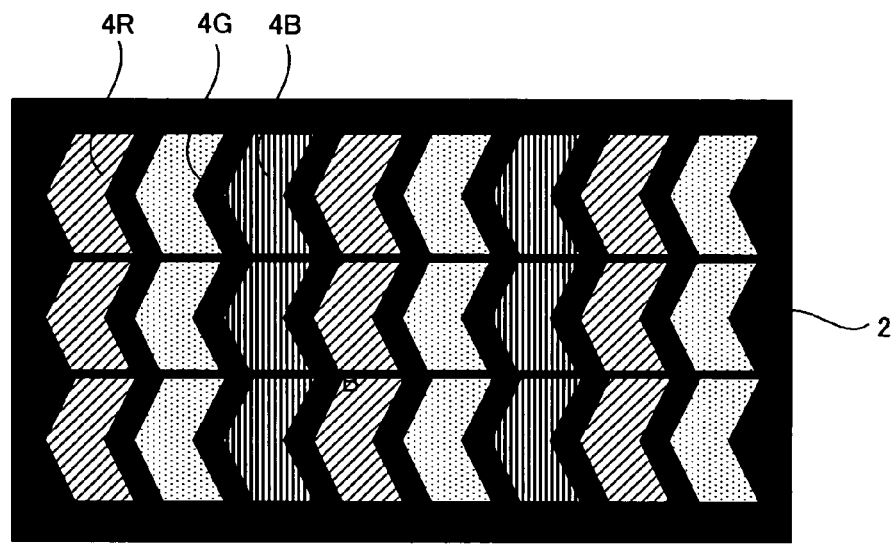
Figure 5C:
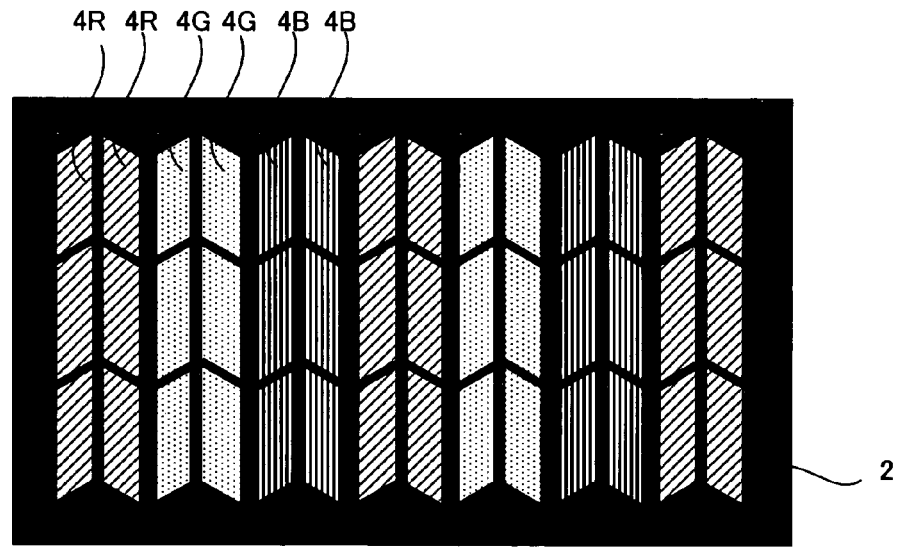

Such a colored layer is formed in general with the three colors of red (R), green (G) and blue (B). Moreover, the colored layer pattern shape used in the present invention can be selected optionally according to the shape of the pixel electrode of the liquid crystal driving side substrate to be disposed facing the color filter for the IPS, or the like. For example, it may be provided as a stripe like pattern as shown in FIG. 5A, or bent patterns as shown in FIGS. 5B and 5C, or the like. Moreover, other known arrangements other than those mentioned above can also be employed, and the coloring area can be set optionally.

In the present invention, the method of coloring the colored layer is not particularly limited. For example, a coating method of coating a known paint by a known method such as spray coating, dip coating, roll coating and bead coating, a vacuum thin film formation, or the like can be presented. In the present invention, coloring by the ink jet method is particularly preferable. Thereby, the colored layer can be formed highly precisely on the wettability changeable pattern, and furthermore, the flatness of the colored layer can be made higher. Moreover, according to the present invention, since the part of the semiconductor photo catalyst containing layer with the energy irradiation is lyophilic, specifically, it has the contact angle with respect to a liquid having 40 mN/m less than 9°, at the time of dropping the colored layer forming coating solution by the ink jet method, the colored layer forming coating solution can be applied without following the bent pattern for example as shown in FIGS. 5B or 5C by the ink head. In general the width for forming the colored layer is about 100 μm, whereas the liquid droplet of the colored layer forming coating solution to be discharged from the ink head is about 30 μm. Therefore, for example, by fixing the ink head, moving the semiconductor photo catalyst containing layer with the wettability changeable pattern formed in the longitudinal direction of the pattern for forming the colored layer while maintaining a constant gap with respect to the ink head, and discharging a colored layer forming coating solution for each colors from the ink head to the part with the bent patterns superimposed, that is, the pattern central part, or the like, the colored layer forming coating solution can be wetted and spread to the entirety of the bent pattern.

Here, as the colored layer forming coating solution to be used for the formation of the colored layer, or the like, those used for the colored layer of a common color filter for the IPS can be used, and thus detailed explanation is omitted.

4. Base Material

Next, the base material used in the present invention will be explained. The base material used in the present invention is not particularly limited as long as the light shielding part and semiconductor photo catalyst containing layer can be formed, and thus those conventionally used for a color filter for the IPS can be used. Specifically, a transparent rigid material without flexibility, such as a quartz glass, a pyrex glass, and a synthetic quartz plate, and a transparent flexible material having flexibility, such as a transparent resin film and an optical resin plate, or the like can be presented. Among these, since the 7059 glass manufactured by Corning Inc. is a material having a small thermal expansion coefficient having the excellent dimensional stability and the operativity in a high temperature heating process, and furthermore, it is a no-alkaline glass not containing an alkaline component in the glass, it is suitable for a color filter for the IPS. In the present invention, in general a transparent base material is used in general, but a reflective substrate and a substrate colored in white can be used as well. Moreover, the base material as needed with the surface process for preventing the alkaeline elution and providing the gas barrier property, or the like applied can be used.

5. Color Filter for the IPS

A color filter for the IPS of the present invention is not particularly limited as long as it has the base material, the light shielding part formed on the base material, the semiconductor photo catalyst containing layer formed so as to cover the base material and the light shielding part, and the colored layer formed on the semiconductor photo catalyst containing layer, and thus for example, those having an over-coating layer formed on the colored layer, those having a transparent conductive layer formed on the base material on an opposite side with respect to the side with the colored layer formed, or the like can be used as well.

In the case an over-coating layer is formed on the colored layer, the influence of the light shielding part to the electric field can be made smaller, and thus it is advantageous. Moreover, flattening of the color filter for the IPS, prevention of the impurity introduction from the light shielding part or the colored layer to the liquid crystal layer provided on the color filter for the IPS, or the like can be achieved.

As such an over-coating layer, the bonding property with respect to the semiconductor photo catalyst containing layer formed on the colored layer, the impurity blocking property, and various resistances such as the light resistance, the smoothness, the heat resistance, the humidity and heat resistance, the chemical resistance, the solvent resistance, the transparency, and the toughness are required. Moreover, according to the present invention, in particular, the specific resistance value is preferably $10^6$ Ω·cm or more. By using such an over-coating layer, at the time of using the color filter for the IPS for a liquid crystal display apparatus, not only by the semiconductor photo catalyst containing layer but also by the over-coating layer, the influence of the light shielding part to the electric field can be made smaller.

As the over-coating layer, specifically, an acrylic resin, an epoxy resin, an acrylic-epoxy resin, a siloxane resin precursor, a silicone polyimide resin precursor, or the like can be used. Furthermore, in the present invention, it is preferable that the over-coating layer has a low swelling ratio because the over-coating layer may be directly contacted with a sealing material at the time of using the color filter for the IPS for a liquid crystal display apparatus. As a method of lowering the swelling ratio of the over-coating layer, a method of controlling the cross linking density or the polarity of the over-coating layer can be presented. As the method of improving the cross linking density, a method of structurally increasing the cross linking points can be presented, and for example, a method of using a polyfunctional acrylic, a polyfunctional epoxy, a trialkoxysilane, or the like can be presented. Moreover, a method of carrying out the coating film formation reaction by the conditions of sufficiently promoting the cross linking reaction can be used as well. For example, a method of the reaction at a high temperature for a long time within a range without generating deterioration of the over-coating layer-such as decomposition and coloring, or the like can be presented. Moreover, as to the structure, it is preferable to use an aliphatic compound than an aromatic compound.

In the present invention, the over-coating layer is formed on the colored layer and on the semiconductor photo catalyst containing layer exposed between the adjacent colored layers. At the time, it is also possible to form the over-coating layer after changing the wettability of the semiconductor photo catalyst containing layer after directing an energy to the semiconductor photo catalyst containing layer. Thereby, the adhesion of the over-coating layer in the color filter for the IPS can be improved.

Moreover, in this embodiment, as mentioned above, it is preferable that a transparent conductive layer is formed on the base material on the opposite side with respect to the side with the colored layer formed. According to the color filter for the IPS, unlike a color filter used for a TN system liquid crystal display apparatus, an electrode layer is not particularly needed in terms of the configuration. However, in this case, since the electricity charged in the color filter for the IPS is not discharged at the time of forming the color filter for the IPS or at the time of use for a liquid crystal display apparatus, the electricity may influence the electric field from the liquid crystal driving side substrate, the foreign substances may easily be adhered, or the conveyance failure may be generated. Therefore, by forming the transparent conductive layer, electrification of the color filter for the IPS can be prevented at the time of producing a color filter for the IPS and at the time of use of the color filter for the IPS for a liquid crystal display apparatus.

The transparent conductive layer is not particularly limited as long as it has the transparency with respect to a visible light and it is capable of preventing electrification of the color filter for the IPS. For example, those having the specific resistance value of 2,000 Ω·cm or less, in particular, 600 Ω·cm or less, and preferably 300 Ω·cm or less can be used.

Moreover, as the material for forming the transparent conductive layer, known metals and metal oxides such as an aluminum, a molybdenum, a chromium, a tantalum, a copper, a tungsten, a titanium, a gold, a silver, an indium, a germanium, a terbium, an ITO, an $In_2O_3$, a $SnO_2$, a ZnO, a ZnO—Ga and a nickel can be used. In particular, an ITO layer can be used preferably. Moreover, such a transparent conductive layer can be formed on the base material by a dipping method, a CVD method or a PVD method, a vacuum deposition method, a sputtering method, an ion plating method, or the like. The film thickness is in general about 10 nm to 100 nm, and in particular about 15 nm to 80 nm.

B. Liquid crystal Display Apparatus

Next, the liquid crystal display apparatus of the present invention will be explained. There are 5 embodiments of the liquid crystal display apparatus of the present invention, and all of them are the IPS system liquid crystal display apparatus using the color filters for the IPS mentioned above. Herein after, each embodiment will be explained in detail.

1. First Embodiment

First, the first embodiment of the liquid crystal display apparatus of the present invention comprises any of the color filters for the IPS, a liquid crystal driving side substrate having an electrode facing the color filter for the IPS, and a liquid crystal layer sandwiched between the color filter for the IPS and the liquid crystal driving side substrate, wherein the specific resistance value of the liquid crystal layer is a predetermined value or more.

Figure 6:
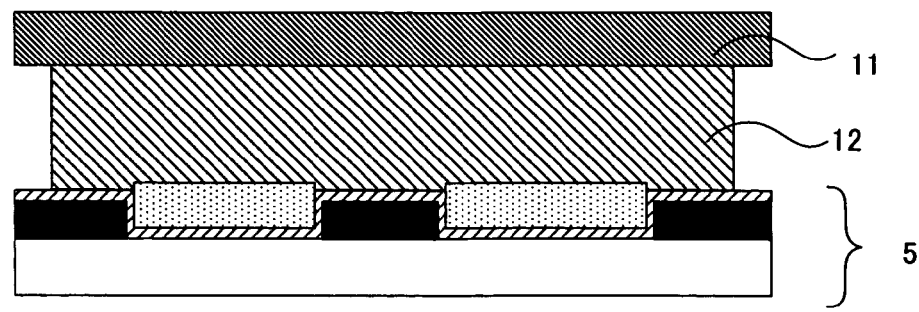
FIG. 6 is a schematic cross-sectional view showing an example of the liquid crystal display apparatus of the present invention.

For example, as shown in FIG. 6, the liquid crystal display apparatus of this embodiment comprises a color filter for the IPS 5, a liquid crystal driving side substrate 11 disposed so as to face the color filter for the IPS 5, and a liquid crystal layer 12 sandwiched between the color filter for the IPS 5 and the liquid crystal driving side substrate 11, wherein the specific resistance value of the liquid crystal layer is a predetermined value or more.

According to this embodiment, since the semiconductor photo catalyst containing layer having the specific resistance value is formed in the color filter for the IPS and the liquid crystal layer has a specific resistance value of a predetermined value or more, disturbance of the electric line of force by the electric field applied from the liquid crystal driving side substrate can be prevented so that a liquid crystal display apparatus capable of providing the high quality liquid crystal display can be provided.

Hereinafter, each configuration of the liquid crystal display apparatus of this embodiment will be explained. Since the color filter for the IPS is same as that explained in the paragraph of "A. Color filter for the IPS", detailed explanation is omitted here.

(Liquid Crystal Layer)

The liquid crystal layer used in this embodiment is to be sandwiched between the color filter for the IPS and the liquid crystal driving side substrate to be described later, and it has the specific resistance value of $10^9$ Ω·cm or more, preferably $10^{13}$ Ω·cm or more.

Here, the value of the specific resistance value of the liquid crystal layer is the value measured as follows. Two glass substrates having a 1 cm square measurement area and a 1 mm width and 10 mm length electrode taking out pattern formed with a gold electrode are prepared so as to be disposed facing with the gold electrodes provided on the inner side. The glass substrates are attached with a sealing material and a gapping agent for producing a measurement cell having a 10 μm gap between the two glass substrates. A liquid crystal material for finding out the specific resistance is sealed in the gap such that the gap between the electrodes is filled with the liquid crystal material. Thereafter, the terminals of the electrodes are taken out for applying the alternative current voltage of a 1 kHz measurement frequency and a 10 mV applied voltage between the electrodes by type 1260 manufactured by Solartron Analytical and finding out the conductivity from the obtained electric current and the specific resistance.

According to such a liquid crystal layer, in the case the voltage is not applied from the liquid crystal driving side substrate to be described later, the liquid crystal composition is aligned in a certain direction, and by applying a voltage form the liquid crystal driving side substrate, the molecule alignment direction of the liquid crystal composition is rotated so as to change the light transmittance.

Since the liquid crystal composition comprising such a liquid crystal layer is same as that used for a common liquid crystal display apparatus for the IPS, detailed explanation is omitted here.

(Liquid Crystal Driving Side Substrate)

Figure 7:
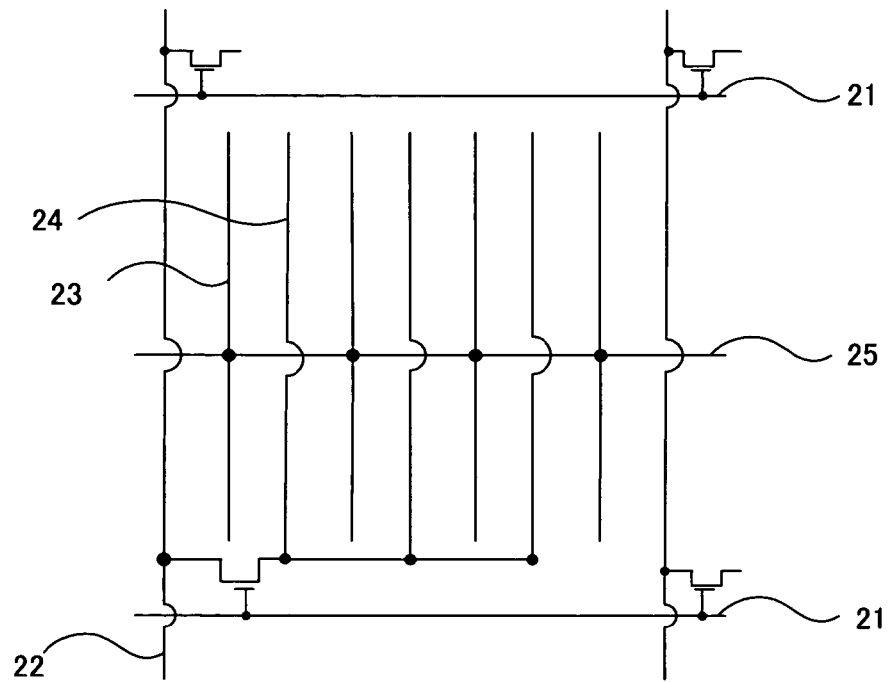
FIG. 7 is an explanatory diagram for explaining an example of an electrode to be formed on the liquid crystal driving side substrate used for the liquid crystal display apparatus of the present invention.

Next, the liquid crystal driving side substrate used in this embodiment will be explained. The liquid crystal driving side substrate used in this embodiment is not particularly limited as long as it is disposed facing the color filter for the IPS and it is capable of applying the electric field so as to orient the liquid crystal in the liquid crystal layer to a predetermined direction. As such a liquid crystal driving side substrate, the electrode group is formed so as to mainly form an electric field parallel to the interface of the liquid crystal layer. For example as shown in FIG. 7, it may comprise a plurality of scanning lines 21, a video signal wiring 22, a pixel electrode 23 (a part of a common electrode 25), a pixel electrode 24 (liquid crystal driving electrode) to be paired with the pixel electrode 23, and an active element (not shown) connected with the scanning lines 21, video signal wiring 22 and pixel electrodes (23 and 24) formed, or the like.

The electrode structure can be selected optionally according to the shape of the color filter for the IPS, the orienting method of the targeted liquid crystal, or the like so that a common IPS system liquid crystal display apparatus can be provided. Moreover, as to the active element, the substrate with the electrodes formed, or the like, since those used for a common IPS system liquid crystal display apparatus can be used, detailed explanation is omitted here.

(Liquid Crystal Display Apparatus)

The liquid crystal display apparatus of this embodiment is not particularly limited as long as it has the color filter for the IPS, the liquid crystal driving side substrate and the liquid crystal layer, and in general it has an orientation film for the predetermined orientation of the liquid crystal, a polarizing means, or the like formed. Since the orientation film, the polarizing means, or the like are same as those used for the common liquid crystal display apparatus can be used, explanation is omitted here. Moreover, as needed, other members may be provided as well.

2. Second Embodiment

Next, the second embodiment of the liquid crystal display apparatus of the present invention will be explained. The liquid crystal display apparatus of this embodiment comprises the color filter for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that the longer side of one of the pixel electrodes is substantially parallel with the longer side direction of the other pixel electrode, and the video signal wiring and pixel electrodes are disposed in a manner bent with respect to the liquid crystal orientation direction by an angle in a range of ±1 degree to ±30 degrees. Here, "the longer side direction of one of the pixel electrodes mentioned above is substantially parallel with the longer side direction of the other pixel electrode" may be the state to the degree with the electric line of force generated at the time of applying a voltage from the liquid crystal driving side substrate provided substantially horizontal with respect to the color filter without disturbance of the electric line of force.

Figure 8:
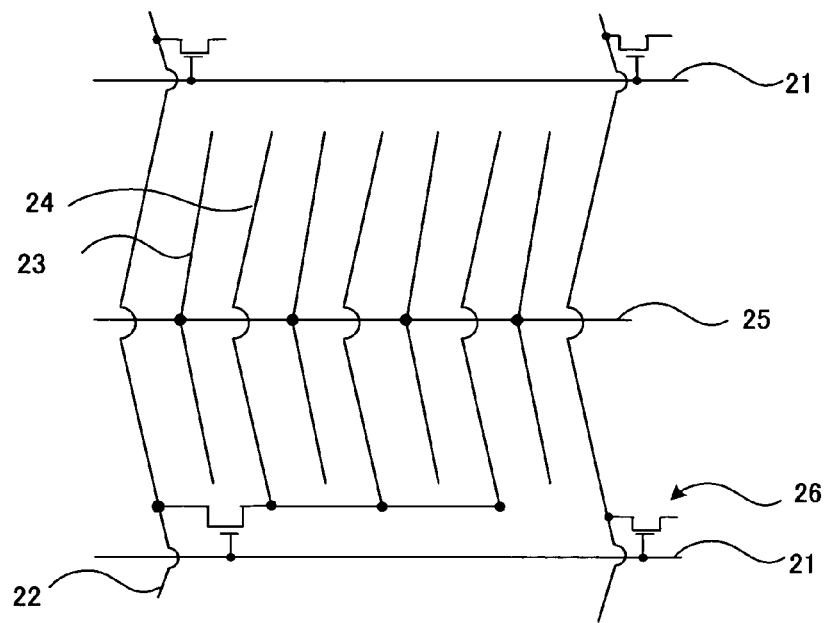
FIG. 8 is an explanatory diagram for explaining an example of an electrode to be formed on the liquid crystal driving side substrate used for a second embodiment or a fourth embodiment of the liquid crystal display apparatus of the present invention.
Figure 9:
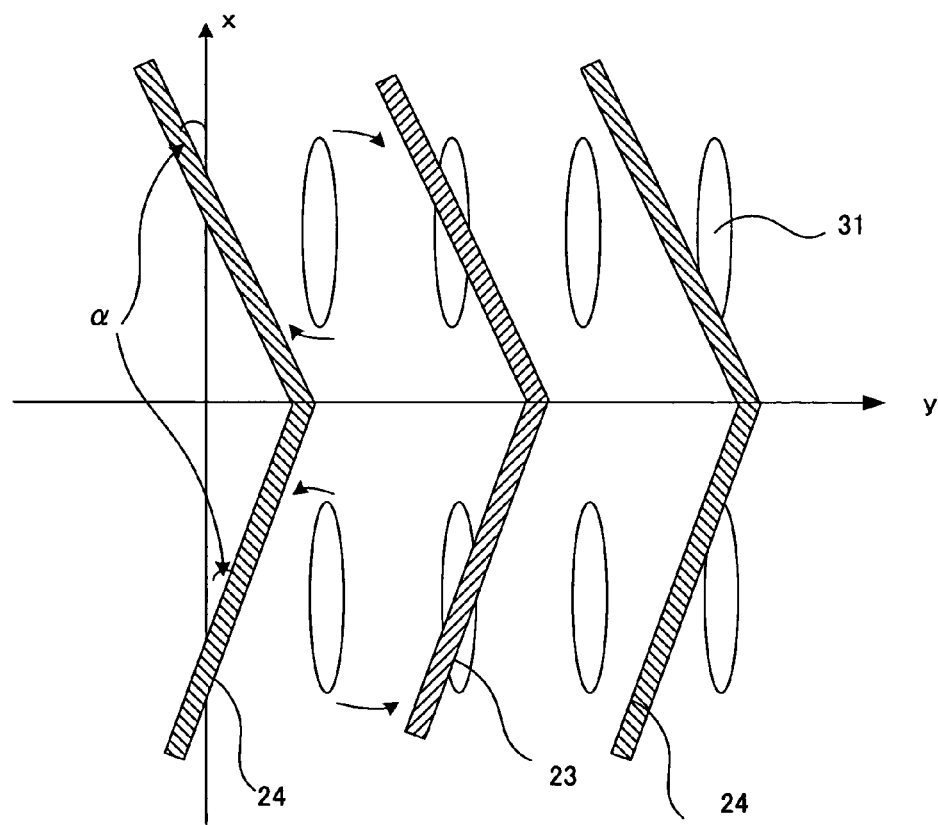
FIG. 9 is an explanatory diagram for explaining the pixel electrodes and the video signal wiring, and the liquid crystal orientation direction in the second embodiment of the liquid crystal display apparatus of the present invention.

For example as shown in FIG. 6, the liquid crystal display apparatus of this embodiment comprises a color filter for the IPS 5, a liquid crystal driving side substrate 11 disposed so as to face the color filter for the IPS 5, and a liquid crystal layer 12 sandwiched between the color filter for the IPS 5 and the liquid crystal driving side substrate 11. For example as shown in FIG. 8, the liquid crystal driving side substrate comprises a plurality of scanning lines 21, a video signal wiring 22, a stripe like pixel electrode 23 (a part of a common electrode 25), a stripe like pixel electrode 24 (liquid crystal driving electrode) to be paired with the pixel electrode 23, and an active element (not shown) connected with the scanning lines 21, video signal wiring 22 and pixel electrodes (23 and 24). Furthermore, at the time, for example as shown in FIG. 9, the pixel electrodes to be paired (23 and 24) and the video signal wiring (not shown) are formed in a bent form so as to have a predetermined angle o with respect to the orientation direction x of the liquid crystal 31 in the liquid crystal layer. According to this embodiment, as the liquid crystal in the liquid crystal layer, a positive dielectric constant anisotropic liquid crystal (p type liquid crystal) is used. Moreover, in general two polarizing plates are used for a liquid crystal display apparatus. These polarizing plates are used facing with each other such that the polarization axis of one of the polarizing plates is in the x direction and the polarization axis of the other polarizing plate is in the y direction.

According to this embodiment, since the color filter for the IPS is used, the liquid crystal can be oriented to the targeted direction without disturbance of the electric field applied from the liquid crystal driving side substrate so that a high quality liquid crystal display apparatus without the color irregularity, or the like can be provided. Moreover, since the video signal wiring and the pixel electrodes to be paired are formed in a bent form so as to have the angle with the liquid crystal orientation direction, at the time of applying the electric field from the liquid crystal driving side substrate, for example as shown in FIG. 9, the two direction liquid crystal rotation motions are generated. Therefore, the angle of visibility is improved so that the liquid crystal response speed, or the like can be improved as well.

Figure 10:
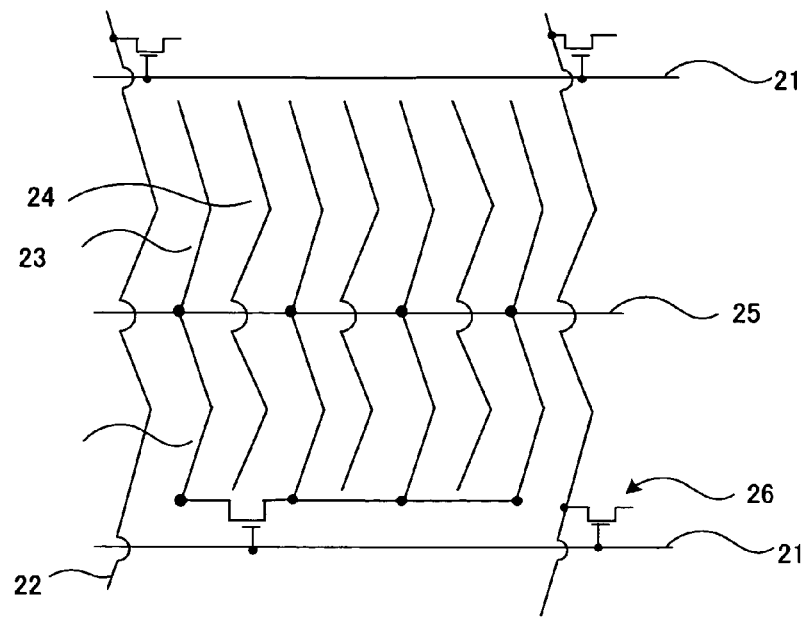
FIG. 10 is an explanatory diagram for explaining another example of an electrode to be formed on the liquid crystal driving side substrate used for the second embodiment of the liquid crystal display apparatus of the present invention.

Here, according to this embodiment, it is preferable that the video signal wiring and pixel electrodes are bent with respect to the liquid crystal orientation direction in a range of ±1 degree to ±30 degrees, in particular, in a range of ±10 degrees to ±25 degrees. Thereby, a liquid crystal display apparatus having a wide angle of visibility can be provided. At the time, the number of bending of the video signal wiring and pixel electrodes is not particularly limited. For example as shown in FIG. 10, the pixel electrodes (23 and 24) to be paired and the video signal wiring (not shown) bent by a plurality of times, or the like can be used.

Since the color filter for the IPS used for the liquid crystal display apparatus of this embodiment is same as that explained in the paragraph of "A. Color filter for the IPS", and furthermore, since the liquid crystal layer may be same as that of the first embodiment, detailed explanation is omitted here.

Moreover, the liquid crystal display apparatus of this embodiment is not particularly limited as long as it has the color filter for the IPS, the liquid crystal driving side substrate and the liquid crystal layer, and in general it has an orientation film for the predetermined orientation of the liquid crystal, a polarizing means, or the like formed. Since the orientation film, the polarizing means, or the like are same as those used for the common liquid crystal display apparatus can be used, explanation is omitted here. Moreover, as needed, other members may be provided as well.

3. Third Embodiment

Next, the third embodiment of the liquid crystal display apparatus of the present invention will be explained. The liquid crystal display apparatus of this embodiment comprises the color filter for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that the longer side of one of the pixel electrodes is substantially parallel with the longer side direction of the other pixel electrode, and the scanning lines and pixel electrodes are disposed in a manner bent with respect to the liquid crystal orientation direction by an angle in a range of ±1 degree to ±30 degrees. Here, "the longer side direction of one of the pixel electrodes mentioned above is substantially parallel with the longer side direction of the other pixel electrode" may be the state to the degree with the electric line of force generated at the time of applying a voltage from the liquid crystal driving side substrate provided substantially horizontal with respect to the color filter without disturbance of the electric line of force.

Figure 11:
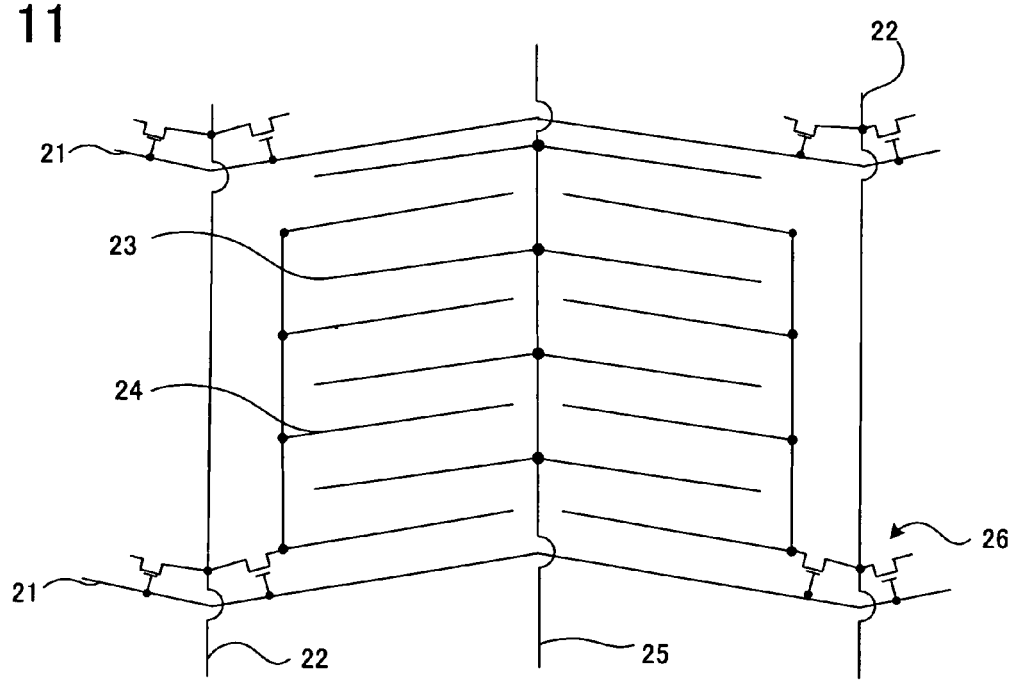
FIG. 11 is an explanatory diagram for explaining an example of an electrode to be formed on the liquid crystal driving side substrate used for a third embodiment or a fifth embodiment of the liquid crystal display apparatus of the present invention.

For example as shown in FIG. 6, the liquid crystal display apparatus of this embodiment comprises a color filter for the IPS 5, a liquid crystal driving side substrate 11 disposed so as to face the color filter for the IPS 5, and a liquid crystal layer 12 sandwiched between the color filter for the IPS 5 and the liquid crystal driving side substrate 11. For example as shown in FIG. 11, the liquid crystal driving side substrate comprises a plurality of scanning lines 21, a video signal wiring 22, a stripe like pixel electrode 23 (a part of a common electrode 25), a stripe like pixel electrode 24 (liquid crystal driving electrode) to be paired with the pixel electrode 23, and an active element (not shown) connected with the scanning lines 21, video signal wiring 22 and pixel electrodes (23 and 24). Furthermore, at the time, the pixel electrodes to be paired and the scanning line are formed in a bent form so as to have a predetermined angle with respect to the orientation direction of the liquid crystal in the liquid crystal layer. According to this embodiment, as the liquid crystal in the liquid crystal layer, a positive dielectric constant anisotropic liquid crystal (p type liquid crystal) is used.

According to this embodiment, since the color filter for the IPS is used, the liquid crystal can be oriented to the targeted direction without disturbance of the electric field applied from the liquid crystal driving side substrate so that a high quality liquid crystal display apparatus without the color irregularity, or the like can be provided. Moreover, since the scanning lines and the pixel electrodes to be paired are formed in a bent form so as to have the angle with the liquid crystal orientation direction, at the time of applying the electric field from the liquid crystal driving side substrate, for example as shown in FIG. 9, the two direction liquid crystal rotation motions are generated. Therefore, the angle of visibility is improved so that the liquid crystal response speed, or the like can be improved as well.

Here, according to this embodiment, it is preferable that the scanning lines and pixel electrodes are bent with respect to the liquid crystal orientation direction in a range of ±1 degree to ±30 degrees, in particular, in a range of ±10 degrees to ±25 degrees. Thereby, a liquid crystal display apparatus having a wide angle of visibility can be provided. Moreover, also according to this embodiment, the pixel electrodes to be paired and the scanning lines may be bent for a plurality of times.

Since the color filter for the IPS used for the liquid crystal display apparatus of this embodiment is same as that explained in the paragraph of "A. Color filter for the IPS", and furthermore, since the liquid crystal layer may be same as that of the first embodiment, detailed explanation is omitted here.

Moreover, the liquid crystal display apparatus of this embodiment is not particularly limited as long as it has the color filter for the IPS, the liquid crystal driving side substrate and the liquid crystal layer, and in general it has an orientation film for the predetermined orientation of the liquid crystal, a polarizing means, or the like formed. Since the orientation film, the polarizing means, or the like are same as those used for the common liquid crystal display apparatus can be used, explanation is omitted here. Moreover, as needed, other members may be provided as well.

4. Fourth Embodiment

Next, the fourth embodiment of the liquid crystal display apparatus of the present invention will be explained. The fourth embodiment of the liquid crystal display apparatus of the present invention comprises the color filter for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that the longer side of one of the pixel electrodes is substantially parallel with the longer side direction of the other pixel electrode, and the video signal wiring and pixel electrodes are disposed in a manner bent with respect to the liquid crystal orientation direction by an angle in a range of 60 degrees to 120 degrees except 90 degrees. Here, "the longer side direction of one of the pixel electrodes mentioned above is substantially parallel with the longer side direction of the other pixel electrode" may be the state to the degree with the electric line of force generated at the time of applying a voltage from the liquid crystal driving side substrate provided substantially horizontal with respect to the color filter without disturbance of the electric line of force.

Figure 12:
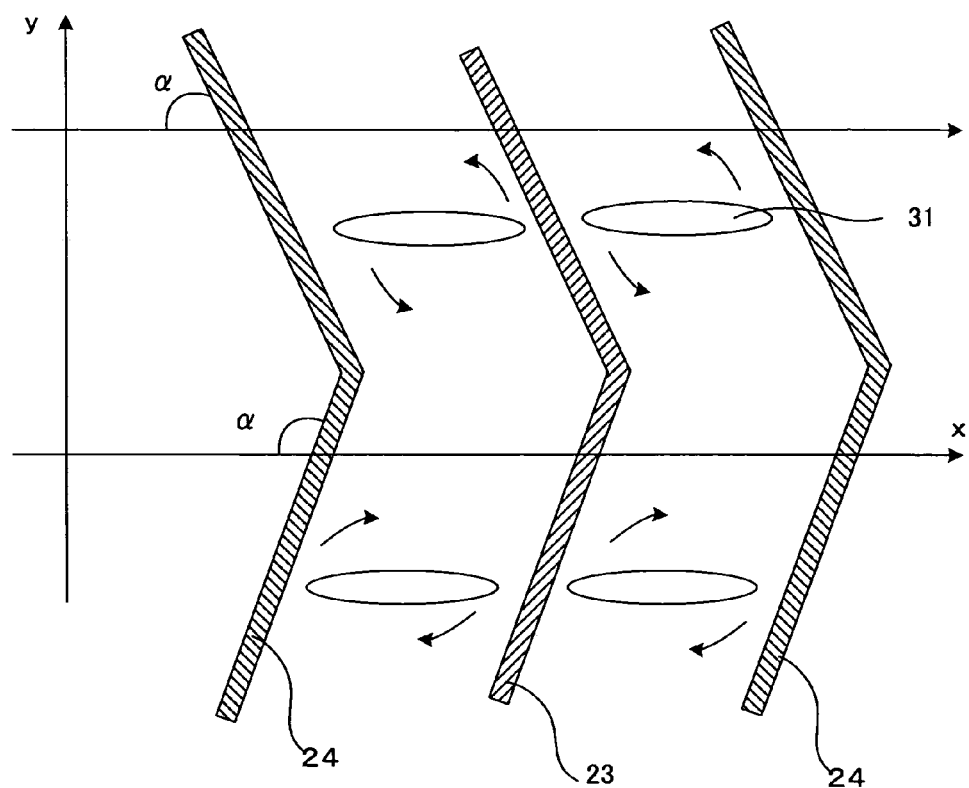
FIG. 12 is an explanatory diagram for explaining the pixel electrodes and the video signal wiring, and the liquid crystal orientation direction in the fourth embodiment of the liquid crystal display apparatus of the present invention.
Figure 13:
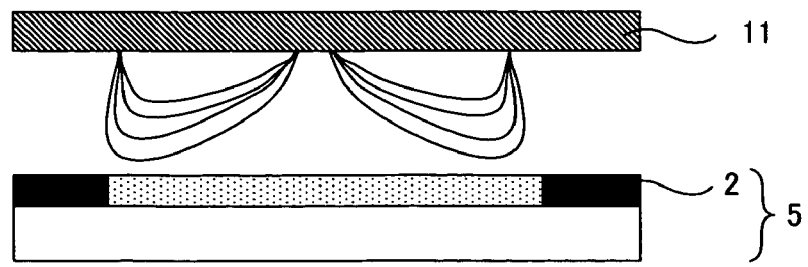
FIG. 13 is an explanatory diagram showing the electric line of force at the time of using the conventional color filter for the IPS for a liquid crystal display apparatus.

For example as shown in FIG. 6, the liquid crystal display apparatus of this embodiment comprises a color filter for the IPS 5, a liquid crystal driving side substrate 11 disposed so as to face the color filter for the IPS 5, and a liquid crystal layer 12 sandwiched between the color filter for the IPS 5 and the liquid crystal driving side substrate 11. For example as shown in FIG. 8, the liquid crystal driving side substrate comprises a plurality of scanning lines 21, a video signal wiring 22, a stripe like pixel electrode 23 (a part of a common electrode 25), a stripe like pixel electrode 24 (liquid crystal driving electrode) to be paired with the pixel electrode 23, and an active element (not shown) connected with the scanning lines 21, video signal wiring 22 and pixel electrodes (23 and 24). Furthermore, at the time, for example as shown in FIG. 12, the pixel electrodes to be paired (23 and 24) and the video signal wiring (not shown) are bent by a predetermined angle α with respect to the orientation direction x of the liquid crystal 31 in the liquid crystal layer. According to this embodiment, as the liquid crystal in the liquid crystal layer, a negative dielectric constant anisotropic liquid crystal (n type liquid crystal) is used. Moreover, in general two polarizing plates are used for a liquid crystal display apparatus. These polarizing plates are used facing with each other such that the polarization axis of one of the polarizing plates is in the x direction and the polarization axis of the other polarizing plate is in the y direction.

According to this embodiment, since the color filter for the IPS is used, the liquid crystal can be oriented to the targeted direction without disturbance of the electric field applied from the liquid crystal driving side substrate so that a high quality liquid crystal display apparatus without the color irregularity, or the like can be provided. Moreover, since the video signal wiring and the pixel electrodes to be paired are formed in a bent form so as to have the angle with the liquid crystal orientation direction, at the time of applying the electric field from the liquid crystal driving side substrate, for example as shown in FIG. 12, the two direction liquid crystal rotation motions are generated. Therefore, the angle of visibility is improved so that the liquid crystal response speed, or the like can be improved as well.

Here, according to this embodiment, it is preferable that the video signal wiring and pixel electrodes are bent with respect to the liquid crystal orientation direction in a range of 60 degrees to 120 degrees except 90 degrees, in particular in a range of 70 degrees to 110 degrees except 90 degrees. Thereby, a liquid crystal display apparatus having a wide angle of visibility can be provided. At the time, for example as shown in FIG. 10, the pixel electrodes (23 and 24) to be paired and the video signal wiring (not shown) may be bent by a plurality of times.

Since the color filter for the IPS used for the liquid crystal display apparatus of this embodiment is same as that explained in the paragraph of "A. Color filter for the IPS", and furthermore, since the liquid crystal layer may be same as that of the first embodiment, detailed explanation is omitted here.

Moreover, the liquid crystal display apparatus of this embodiment is not particularly limited as long as it has the color filter for the IPS, the liquid crystal driving side substrate and the liquid crystal layer, and in general it has an orientation film for the predetermined orientation of the liquid crystal, a polarizing means, or the like formed. Since the orientation film, the polarizing means, or the like are same as those used for the common liquid crystal display apparatus can be used, explanation is omitted here. Moreover, as needed, other members may be provided as well.

5. Fifth Embodiment

Next, the fifth embodiment of the liquid crystal display apparatus of the present invention will be explained. The liquid crystal display apparatus of this embodiment comprises the color filter for the IPS, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that the longer side of one of the pixel electrodes is substantially parallel with the longer side direction of the other pixel electrode, and the scanning lines and pixel electrodes are disposed in a manner bent with respect to the liquid crystal orientation direction by an angle in a range of 60 degrees to 120 degrees except 90 degrees. Here, "the longer side direction of one of the pixel electrodes mentioned above is substantially parallel with the longer side direction of the other pixel electrode" may be the state to the degree with the electric line of force generated at the time of applying a voltage from the liquid crystal driving side substrate provided substantially horizontal with respect to the color filter without disturbance of the electric line of force.

For example as shown in FIG. 6, the liquid crystal display apparatus of this embodiment comprises a color filter for the IPS 5, a liquid crystal driving side substrate 11 disposed so as to face the color filter for the IPS 5, and a liquid crystal layer 12 sandwiched between the color filter for the IPS 5 and the liquid crystal driving side substrate 11. For example as shown in FIG. 11, the liquid crystal driving side substrate comprises a plurality of scanning lines 21, a video signal wiring 22, a stripe like pixel electrode 23 (a part of a common electrode 25), a stripe like pixel electrode 24 (liquid crystal driving electrode) to be paired with the pixel electrode 23, and an active element (not shown) connected with the scanning lines 21, video signal wiring 22 and pixel electrodes (23 and 24). Furthermore, at the time, the pixel electrodes to be paired and the scanning lines are bent by a predetermined angle with respect to the orientation direction of the liquid crystal in the liquid crystal layer. According to this embodiment, as the liquid crystal in the liquid crystal layer, a negative dielectric constant anisotropic liquid crystal (n type liquid crystal) is used.

According to this embodiment, since the color filter for the IPS is used, the liquid crystal can be oriented to the targeted direction without disturbance of the electric field applied from the liquid crystal driving side substrate so that a high quality liquid crystal display apparatus without the color irregularity, or the like can be provided. Moreover, since the scanning lines and the pixel electrodes to be paired are bent so as to form the angle with the liquid crystal orientation direction, at the time of applying the electric field from the liquid crystal driving side substrate, for example as shown in FIG. 12, the two direction liquid crystal rotation motions are generated. Therefore, the angle of visibility is improved so that the liquid crystal response speed, or the like can be improved as well.

Here, according to this embodiment, it is preferable that the scanning lines and pixel electrodes are bent with respect to the liquid crystal orientation direction in a range of 60 degrees to 120 degrees except 90 degrees, in particular in a range of 70 degrees to 110 degrees except 90 degrees. Thereby, a liquid crystal display apparatus having a wide angle of visibility can be provided. Also in this embodiment, the pixel electrodes to be paired and the scanning lines may be bent by a plurality of times.

Since the color filter for the IPS used for the liquid crystal display apparatus of this embodiment is same as that explained in the paragraph of "A. Color filter for the IPS", and furthermore, since the liquid crystal layer may be same as that of the first embodiment, detailed explanation is omitted here.

Moreover, the liquid crystal display apparatus of this embodiment is not particularly limited as long as it has the color filter for the IPS, the liquid crystal driving side substrate and the liquid crystal layer, and in general it has an orientation film for the predetermined orientation of the liquid crystal, a polarizing means, or the like formed. Since the orientation film, the polarizing means, or the like are same as those used for the common liquid crystal display apparatus can be used, explanation is omitted here. Moreover, as needed, other members may be provided as well.

C. Production Method for a Color Filter for the IPS

Finally, the production method for a color filter for the IPS of the present invention will be explained. The production method for a color filter for the IPS of the present invention is a production method for producing the color filter for the IPS, in which the colored layer is the colored layer mentioned above, wherein the colored layer is bent and formed by relatively moving the substrate, the head of the ink jet apparatus for forming the colored layer at the time of forming the colored layer by the ink jet method, and dropping an ink discharged from the head linearly with respect to the bent colored layer so that the bent colored layer is formed by wetting and spreading the dropped ink.

According to the present invention, in addition to the effects of the color filter for the IPS, since the color ink discharged by the ink jet method wets and spreads on the semiconductor photo catalyst containing layer, even in the case the ink for forming the colored layer is discharged linearly with respect to the bent colored layer for the IPS, a color filter can be produced. Therefore, owing to the operation easiness, a highly precise product can be produced as well as the production yield can be improved.

Since each configuration of the production method for a color filter for the IPS of the present invention is same as that explained in the paragraph of "A. Color filter for the IPS", explanation is omitted here.

The present invention is not limited to the embodiments. The embodiments are merely examples, and any one having the substantially same configuration as the technological idea disclosed in the claims of the present invention and the same effects is included in the technological scope of the present invention.

EXAMPLES

Hereinafter, the present invention will be explained in further details with reference to the examples. As the semiconductor photo catalyst containing layer forming ink, the photosetting resin composition ink, the light shielding part ink, and the colored layer forming coating solution, the following were used.

<Preparation of the Semiconductor Photo Catalyst Containing Layer Forming Ink>

30 g of an isopropyl alcohol, 0.5 g of MF-160E containing a fluoroalkylsilane as the main component (manufactured by Tohkem Co., Ltd.), 3.5 g of a trimethoxymethylsilane (manufactured by GE Toshiba Silicones, TSL 8113), and 21 g of ST-K01 (manufactured by ISHIHARA SANGYO KAISHA, LTD.) as a semiconductor photo catalyst as a titanium oxide aqueous dispersion were mixed and agitated at 100° C. for 20 minutes. The same was diluted by an isopropyl alcohol to 3.5 times so as to provide a semiconductor photo catalyst containing layer composition.

<Preparation of the Photosetting Resin Composition Ink>

(Synthesis of the Copolymer Resin Solution)

A solution prepared by dissolving 529 g of a dicyclohexyl fumarate (DCHF) and 171 g of an acrylic acid (AA) in 300 g of a diethyleneglycoldimethylether (DMDG) together with 14 g of perbutyl O (product name, an organic peroxide manufactured by Nippon Oil & Fat Corporation) was dropped into a polymerization vessel with a nitrogen atmosphere with 1,000 g of a DMDG and the temperature adjusted to 80° C. over 6 hours, and it was matured and polymerized at the same temperature for 4 hours so as to obtain a copolymer resin solution.

(Preparation of the Photosetting Resin Composition Ink)

By agitating and mixing the below-mentioned materials of the below-mentioned amounts, a photosetting resin composition ink was obtained.

the copolymer resin solution (solid component 35%): 69.0 parts by weight dipentaerythritolpentaacrylate (SR399, manufactured by Sartomer Company Inc.): 11.0 parts by weight Orthocresolnovolak type epoxy resin (product name: EPIKOTE 180S70, manufactured by Japan Epoxy Resins Co., Ltd.): 15.0 parts by weight
2-methyl-1-(4-methylthiophenyl)-2-morpholinopropanone-1: 1.5 parts by weight
2,2'-bis(O-chlorophenyl)-4,5,4',5'-tetraphenyl-1,2'-biimidazole: 1.0 part by weight
DMDG: 66.0 parts by weight <Preparation of the Light Shielding Part Ink>

First, the components of the below-mentioned amounts were mixed and dispersed sufficiently with a sand mill so as to prepare a black pigment dispersion.
black pigment: 23 parts
polymer dispersing agent (product name: Disperbyk 111, manufactured by BYC-Chemie Japan KK): 2 parts by weight
solvent (DMDG): 75 parts by weight
Next, by sufficiently mixing the components of the below-mentioned amounts, a photosetting light shielding part ink was obtained.
the black pigment dispersion: 61 parts by weight
the photosetting resin composition ink 1: 20 parts by weight
solvent (DMDG): 30 parts by weight <Preparation of the Colored Layer Forming Coating Solution>

By mixing 5 parts by weight of a pigment, 20 parts by weight of a solvent, 70 parts by weight of an acrylic acid/bencylacrylate copolymer, and 5 parts by weight of a bifunctional epoxy containing monomer, thermosetting type polyepoxyacrylate inks for each RGB colors were prepared. For each of the red, green and blue inks, as the solvent, a polyethyleneglycolmonomethylethylacetate, and as the pigment, for the red ink, C. I. Pigment Red 177, for the green ink, C. I. Pigment Green 36, and for the blue ink, C. I. Pigment Blue 15 +C. I. Pigment Violet 23 were used, respectively.

Example 1

<Form of the Electrodes of the IPS Liquid Crystal Driving Side Substrate>

As shown in FIG. 8, the form of the IPS liquid crystal driving side substrate was provided such that a unit pixel comprises a scanning line 21, a video signal wiring 22, a pixel electrode (apart of a common electrode), a pixel electrode (liquid crystal driving electrode), a common electrode 25, and a TFT 26. Moreover, at the time, for example as shown in FIG. 9, the video signal wiring and the pixel electrodes were bent so as to have a ±15 degree angle with respect to the molecules 31 (p type liquid crystal molecules) of the positive dielectric constant anisotropic liquid crystals at the time without the electric field of the liquid crystal layer to be formed. Moreover, at the time, the pixel electrodes were bent by two times in the unit pixel.

<Production of the Color Filter>

A photosetting light shielding part layer having about 1 μm thickness was formed by applying the photosetting light shielding part ink onto a 1.1 mm thickness glass substrate (AL material manufactured by ASAHI GLASS CO., LTD.) by a spin coater, and drying the same at 100° C. for 3 minutes. After the pattern exposure of the photosetting light shielding part with an extra high pressure mercury lamp using the pixel electrodes (liquid crystal driving electrodes) of the IPS liquid crystal driving side substrate, and a mask (having the opening part corresponding to the pixel electrodes and a 30 μm line width) corresponding to the pixel electrodes (a part of the common electrodes), it was developed with an aqueous solution of a 0.05% potassium hydroxide. Thereafter, a light shielding part was formed by applying a heat treatment while leaving the substrate in a 180° C. atmosphere for 30 minutes.

Next, a transparent semiconductor photo catalyst containing layer (thickness 0.3 μm) was formed by respectively applying the semiconductor photo catalyst containing ink onto the soda glass transparent substrate with the light shielding part formed by a spin coater, and carrying out a drying process at 150° C. for 10 minutes.

(Confirmation of Formation of a Lyophilic Area by the Exposure)

An exposed part was formed by carrying out a pattern exposure by a 70 mW/cm$^2$ illuminance by a mercury lamp (wavelength 365 nm) via a mask for 50 seconds to the semiconductor photo catalyst containing layer for measuring the contact angles with liquids of the unexposed part and the exposed part. As to the unexposed part, the contact angle was measured with respect to a liquid of 30 mN/m surface tension (manufactured by JUNSEI CHEMICAL, CO., LTD., an ethyleneglycolmonoethylether) was measured (30 seconds after of dropping liquid droplets from a micro syringe) using a contact angle measuring device (CA-Z type manufactured by Kyowa Interface Science, Co., Ltd.), and it was 30°. Moreover, as to the exposed part, the contact angle was measured with respect to a liquid of 50 mN/m surface tension (manufactured by JUNSEI CHEMICAL, CO., LTD., a wetting index standard solution No. 50) in the same manner, and it was 7°. Accordingly, it was confirmed that the exposed part has become a lyophilic area compared with the unexposed part so that the pattern formation according to the difference of the wettability of the exposed part and the unexposed part can be enabled.

(Formation of the Colored Layer)

Next, using a photo mask corresponding to the respective light shielding parts, exposure (by the same exposure conditions as those of the confirmation of the formation of the lyophilic area by the exposure) is carried out on the semiconductor photo catalyst containing layer by a 110 μm line width and a 20 μm interval (out of the 110 μm line width, 5 μm on the both sides are formed on the light shielding parts) so as to provide the lyophilic property in the colored layer exposed part. Next, using the ink jet devices each for RGB, the colored layer forming coating solutions were adhered linearly onto the opening part of the colored layer exposed part provided with the lyophilic property. As a result, the adhered inks wetted and spread on the entire surface of the opening part so that a bent RGB stripe type color filter for the IPS having a 100 μm line width and a 30 μm light shielding part was obtained by hardening while carrying out a heat treatment at 150° C. for 30 minutes.

Example 2

It was carried out in the same manner as in the example 1 except that the form of the electrodes of the IPS liquid crystal driving side substrate was as mentioned below and the light shielding part pattern of the color filter was changed to a pattern corresponding to the pixel electrodes (liquid crystal driving electrodes) of the form of the electrodes for the IPS liquid crystal driving side substrate and the pixel electrodes (a part of the common electrodes).

<Form of the Electrodes of the IPS Liquid Crystal Driving Side Substrate>

For example, as shown in FIG. 11, the form of the electrodes of the IPS liquid crystal driving side substrate was provided such that the unit pixel comprises a scanning line 21, a video signal wiring 22, a pixel electrode (a part of the common electrodes) 23, a pixel electrode (liquid crystal driving electrode) 24, a common electrode 25, and a TFT 26. At the time, for example as shown in FIG. 9, the scanning lines and the pixel electrodes were bent so as to have a ±17 degree angle with respect to the molecules 31 (p type liquid crystal molecules) of the positive dielectric constant anisotropic liquid crystals at the time without the electric field of the liquid crystal layer to be formed. Moreover, at the time, the pixel electrodes are bent by two times in the unit pixel.

Example 3

It was carried out in the same manner as in the example 1 except that the form of the electrodes of the IPS liquid crystal driving side substrate was as mentioned below and the light shielding part pattern of the color filter was changed to a pattern corresponding to the pixel electrodes (liquid crystal driving electrodes) of the form of the electrodes for the IPS liquid crystal driving side substrate and the pixel electrodes (a part of the common electrodes).

<Formation of the IPS Liquid Crystal Driving Side Substrate>

The same substrate as in the example 1 was provided except that the video signal wiring and the pixel electrodes were formed in a bent manner so as to have a predetermined angle α with respect to the molecules 31 (N type liquid crystal molecules) of the negative dielectric constant anisotropic liquid crystals at the time without the electric field of the liquid crystal layer to be formed for example as shown in FIG. 12. At the time, as the bent angle α, 70 degrees and 110 degrees were selected. Moreover, at the time, the pixel electrodes are bent by two times in the unit pixel.

Example 4

It was carried out in the same manner as in the example 1 except that the form of the electrodes of the IPS liquid crystal driving side substrate was as mentioned below and the light shielding part pattern of the color filter was changed to a pattern corresponding to the pixel electrodes (liquid crystal driving electrodes) of the IPS liquid crystal driving side substrate and the pixel electrodes (a part of the common electrodes).

<Formation of the IPS Liquid Crystal Driving Side Substrate>

The same substrate as in the example 2 was provided except that the scanning lines and the pixel electrodes were formed in a bent manner so as to have a predetermined angle α with respect to the molecules 31 (N type liquid crystal molecules) of the negative dielectric constant anisotropic liquid crystals at the time without the electric field of the liquid crystal layer to be formed for example as shown in FIG. 12. At the time, as the bent angle α, 60 degrees and 120 degrees were selected. Moreover, at the time, the pixel electrodes are bent by one time in the unit pixel.

Example 5

A 1 μm film thickness transparent over-coating layer was formed by applying the photosetting resin composition ink onto the colored layer side surface of the color filter for the IPS obtained in the example 1 with a spin coater and drying the same at 100° C. for 3 minutes.

Example 6

An over-coating layer was formed on the colored layer side surface of the color filter for the IPS obtained in the example 2 in the same manner as in the example 5.

Example 7

An over-coating layer was formed on the colored layer side surface of the color filter for the IPS obtained in the example 3 in the same manner as in the example 5.

Example 8

An over-coating layer was formed on the colored layer side surface of the color filter for the IPS obtained in the example 4 in the same manner as in the example 5.

Example 9

<Production of the Liquid Crystal Display Apparatus>

A liquid crystal driving side substrate having the electrodes of the electrode form for the liquid crystal driving side substrate of the example 1 was formed. Thereafter, the color filter for the IPS of the example 1 and the liquid crystal driving side substrate were disposed so as to face with each other via a 2 μm gap (with the color filter formation surface and the driving circuit side face with each other on the inner side). By filling a liquid crystal having the positive dielectric anisotropy (P type LC) and sealing the non pixel areas so as to surround the colored layer with a sealing material, a liquid crystal cell was formed.

At the time, prior thereto, a polyimide film was provided to the color filter surface and the liquid crystal driving circuit surface and a rubbing process was applied thereto. As to the rubbing direction, it was carried out to the x axis direction shown in FIG. 9.

Moreover, 2 TAC (triacetylcellulose) substrates were used as the polarizing plates. With one of them disposed with the polarization direction to the x axis and the other polarizing plate disposed with the polarization axis to the y axis so as to have the polarization directions orthogonal with each other with respect to the obtained liquid crystal cell, a lateral electric field system liquid crystal display apparatus was produced. A sharp image with a wide angle of visibility was obtained by the obtained liquid crystal display apparatus.

Example 10

A liquid crystal driving side substrate having the electrodes of the electrode form for the liquid crystal driving side substrate of the example 2 was formed. Thereafter, in the same manner as in the example 9 except that the color filter for the IPS of the example 2 was used, a liquid crystal display apparatus was produced. A sharp image with a wide angle of visibility was obtained by the obtained liquid crystal display apparatus.

Example 11

A liquid crystal driving side substrate having the electrodes of the electrode form for the liquid crystal driving side substrate of the example 3 was formed. Thereafter, in the same manner as in the example 9 except that the color filter for the IPS of the example 3 was used and the liquid crystal having the negative dielectric anisotropy (N type LC) was used, a liquid crystal display apparatus was produced. A sharp image with a wide angle of visibility was obtained by the obtained liquid crystal display apparatus.

Example 12

A liquid crystal driving side substrate having the electrodes of the electrode form for the liquid crystal driving side substrate of the example 4 was formed. Thereafter, in the same manner as in the example 9 except that the color filter for the IPS of the example 4 was used and the liquid crystal having the negative dielectric anisotropy (N type LC) was used, a liquid crystal display apparatus was produced. A sharp image with a wide angle of visibility was obtained by the obtained liquid crystal display apparatus.

Example 13

A liquid crystal driving side substrate having the electrodes of the electrode form for the liquid crystal driving side substrate of the example 1 was formed. Thereafter, in the same manner as in the example 9 except that the color filter for the IPS of the example 5 was used, a liquid crystal display apparatus was produced. A sharp image with a wide angle of visibility was obtained by the obtained liquid crystal display apparatus.

Example 14

A liquid crystal driving side substrate having the electrodes of the electrode form for the liquid crystal driving side substrate of the example 2 was formed. Thereafter, in the same manner as in the example 9 except that the color filter for the IPS of the example 6 was used, a liquid crystal display apparatus was produced. A sharp image with a wide angle of visibility was obtained by the obtained liquid crystal display apparatus.

Example 15

A liquid crystal driving side substrate having the electrodes of the electrode form for the liquid crystal driving side substrate of the example 3 was formed. Thereafter, in the same manner as in the example 9 except that the color filter for the IPS of the example 7 was used and the liquid crystal having the negative dielectric anisotropy (N type LC) was used, a liquid crystal display apparatus was produced. A sharp image with a wide angle of visibility was obtained by the obtained liquid crystal display apparatus.

Example 16

A liquid crystal driving side substrate having the electrodes of the electrode form for the liquid crystal driving side substrate of the example 4 was formed. Thereafter, in the same manner as in the example 9 except that the color filter for the IPS of the example 8 was used and the liquid crystal having the negative dielectric anisotropy (N type LC) was used, a liquid crystal display apparatus was produced. A sharp image with a wide angle of visibility was obtained by the obtained liquid crystal display apparatus.

Example 17

Using the color filter of the example 1, and furthermore, an ITO transparent conductive film was formed on the surface without the color filter formation of the glass substrate by the following conditions so as to obtain a color filter with an ITO transparent conductive film.

<Formation of the ITO Film>

With the obtained color filter set with the surface disposed downward in a sputtering awaiting chamber, it was conveyed to a sputtering chamber preliminarily exhausted to the medium vacuum ($1 \times 10^{-4}$ Torr) and then to the $1 \times 10^{-6}$ Torr pressure so that the substrate was heated to 210° C. An Ar gas containing 1.5 vol % of $O^2$ was introduced into the sputtering chamber and the electric discharge gas pressure was controlled to $1.8 \times 10^{-4}$ Torr. Using an ITO target including 10 wt % of $SnO_2$, having a 150×457 mm size and a $1.9 \times 10^{-4}$ Ω·cm resistivity, sputtering was carried out with a 20 mA/cm$^2$ target electric current density and a 10 Ω electric discharge impedance for a 900 G target surface magnetic field so as to form an ITO film having a 170 nm film thickness and a 20 Ω/square resistance value.

According to the obtained color filter, the rear side electrification was not generated nor was adhesion of the dusts, or the like by the static electricity so that the stable production can be enabled in the assembly process for the liquid crystal display apparatus and the production yield was further improved.

Comparative Examples 1 to 4

To the color filters for the IPS formed in the examples 5 to 8, the colored layer forming ink was dropped to the bent area for dropping the ink with the substrate moved non linearly, following the area. As a result, the colored layer forming ink was dropped to the other color area, off the area to be dropped so as to cause color mixture, and thus a preferable color filter for the IPS was not obtained.

[Measurement of the Specific Resistance Value]

Here, the specific resistance values of the light shielding part, semiconductor photo catalyst containing layer and over-coating layer of the color filters for the IPS of the examples 1 to 8 were measured. Each specific resistance was calculated as follows.

Any layer of the light shielding part, semiconductor photo catalyst containing layer and over-coating layer was formed on a glass substrate having an ITO electrode with a 1 cm square measurement area and a 1 mm width, 10 mm length electrode taking out pattern formed preliminarily in the same conditions as in the examples 1 to 8. Then, onto any of the layers, a 0.1 μm gold electrode was formed by the vacuum deposition method so as to be superimposed on the ITO electrode measurement surface via the layer for forming a sandwich cell. To the gold electrode, an electrode taking out pattern was formed in the same shape as the ITO electrode at a position not superimposed on the ITO electrode taking out pattern. Subsequently, the electrode area and the thickness of each layer were calculated from the obtained electric current value by applying a constant voltage using a Model 237 High-Voltage Source-Measure Unit produced by Keithley Instruments Inc., and it was converted by the conductivity ratio so as to obtain the specific resistance.

As a result, in any example, it was $10^{14}$ Ω·cm for the semiconductor photo catalyst containing layer, $10^{10}$ Ω·cm for the light shielding part and $10^{12}$ Ω·cm for the over-coating layer.

[Measurement of the Specific Resistance of the Liquid Crystal Material]

Moreover, the specific resistance value of each liquid crystal material used for the examples 9 to 16 was measured. Each specific resistance was calculated as follows.

Two glass substrates having a 1 cm square measurement area and a 1 mm width and 10 mm length electrode taking out pattern formed preliminarily with a gold electrode were prepared. A measurement cell was produced by disposing the same so as to face with each other on the inner side and forming a 10 μm gap there between with a sealing agent and gap material. Subsequently, a liquid crystal material for finding out the specific resistance was sealed in the gap so as to fill the gap between the electrodes. The terminals of the respective electrodes were taken out for applying the alternative current voltage of a 1 kHz measurement frequency and a 10 mV applied voltage between the electrodes by type 1260 of Solartron Analytical and finding out the conductivity from the obtained electric current and the specific resistance. The obtained specific resistance value was $10^{10}$ Ω·cm.

What is claimed is:

1. A color filter for the IPS, comprising a base material, a light shielding part formed on the base material, a semiconductor photo catalyst containing layer formed so as to cover the base material and the light shielding part, containing at least a semiconductor photo catalyst and an organopolysiloxane, and a colored layer formed in an opening part of the light shielding part on the semiconductor photo catalyst containing layer, wherein a specific resistance value of the semiconductor photo catalyst containing layer is $10^6$ Ω·cm or more.

2. The color filter for the IPS according to claim 1, wherein the specific resistance value of the light shielding part is $10^6$ Ω·cm or more, and the specific resistance value of the semiconductor photo catalyst containing layer is higher than the specific resistance value of the light shielding part.

3. The color filter for the IPS according to claim 2, wherein an over-coating layer is formed on the colored layer, and the specific resistance value of the over-coating layer is $10^6$ Ω·cm or more.

4. The color filter for the IPS according to claim 3, wherein a transparent conductive layer is formed on the base material on an opposite side with respect to a side with the colored layer formed.

5. The color filter for the IPS according to claim 2, wherein a transparent conductive layer is formed on the base material on an opposite side with respect to a side with the colored layer formed.

6. The color filter for the IPS according to claim 2, wherein the colored layer is formed by an ink jet method.

7. A production method for a color filter for the IPS, in which the color filter is the color filter according to claim 6, wherein the colored layer is bent and formed by relatively moving the substrate, a head of an ink jet apparatus for forming the colored layer at the time of forming the colored layer by the ink jet method, and dropping an ink discharged from the head linearly with respect to the bent colored layer so that the bent colored layer is formed by wetting and spreading the dropped ink.

8. A liquid crystal display apparatus comprising the color filter for the IPS according to claim 2, a liquid crystal driving side substrate having an electrode disposed facing the color filter for the IPS, and a liquid crystal layer sandwiched between the color filter for the IPS and the liquid crystal driving side substrate, wherein the specific resistance value of the liquid crystal layer is $10^9$ Ω·cm or more.

9. A liquid crystal display apparatus comprising the color filter for the IPS according to claim 2, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of ±1 degree to ±30 degrees.

10. A liquid crystal display apparatus comprising the color filter for the IPS according to claim 2, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of ±1 degree to ±30 degrees.

11. A liquid crystal display apparatus comprising the color filter for the IPS according to claim 2, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of 60 degrees to 120 degrees except 90 degrees.

12. A liquid crystal display apparatus comprising the color filter for the IPS according to claim 2, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of 60 degrees to 120 degrees except 90 degrees.

13. The color filter for the IPS according to claim 1, wherein an over-coating layer is formed on the colored layer, and the specific resistance value of the over-coating layer is $10^6$ Ω·cm or more.

14. The color filter for the IPS according to claim 13, wherein a transparent conductive layer is formed on the base material on an opposite side with respect to a side with the colored layer formed.

15. The color filter for the IPS according to claim 1, wherein a transparent conductive layer is formed on the base material on an opposite side with respect to a side with the colored layer formed.

16. The color filter for the IPS according to claim 1, wherein the colored layer is formed by an ink jet method.

17. A production method for a color filter for the IPS, in which the color filter is the color filter according to claim 16, wherein the colored layer is bent and formed by relatively moving the substrate, a head of an ink jet apparatus for forming the colored layer at the time of forming the colored layer by the ink jet method, and dropping an ink discharged from the head linearly with respect to the bent colored layer so that the bent colored layer is formed by wetting and spreading the dropped ink.

18. A liquid crystal display apparatus comprising the color filter for the IPS according to claim 1, a liquid crystal driving side substrate having an electrode disposed facing the color filter for the IPS, and a liquid crystal layer sandwiched between the color filter for the IPS and the liquid crystal driving side substrate, wherein the specific resistance value of the liquid crystal layer is $10^9$ Ω·cm or more.

19. A liquid crystal display apparatus comprising the color filter for the IPS according to claim 1, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of ±1 degree to ±30 degrees.

20. A liquid crystal display apparatus comprising the color filter for the IPS according to claim 1, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of ±1 degree to ±30 degrees.

21. A liquid crystal display apparatus comprising the color filter for the IPS according to claim 1, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the video signal wiring and pixel electrodes are disposed in a manner bent with respect to a liquid crystal orientation direction by an angle in a range of 60 degrees to 120 degrees except 90 degrees.

22. A liquid crystal display apparatus comprising the color filter for the IPS according to claim 1, a liquid crystal driving side substrate disposed facing the color filter for the IPS, and a liquid crystal layer sandwiched between the color filter for the IPS and the liquid crystal driving side substrate, wherein the liquid crystal driving side substrate comprises a plurality of scanning lines disposed as a matrix, a video signal wiring, pixel electrodes to be paired, and an active element connected with the pixel electrodes, the scanning lines, and the video signal wiring, the pixel electrodes to be paired have a strip like shape and disposed such that a longer side of one of the pixel electrodes is substantially parallel with a longer side direction of the other pixel electrode, and the scanning lines and pixel electrodes are disposed in a manner bent with respect to a liquid crystal orientation direction by an angle in a range of 60 degrees to 120 degrees except 90 degrees.

* * * * *